US011018951B2

(12) United States Patent
Casey et al.

(10) Patent No.: US 11,018,951 B2
(45) Date of Patent: *May 25, 2021

(54) METHOD AND SYSTEM FOR IMPLEMENTING INTELLIGENT NETWORK SERVICES AUTOMATION

(71) Applicant: CenturyLink Intellectual Property LLC, Denver, CO (US)

(72) Inventors: Steven M. Casey, Littleton, CO (US); Felipe Castro, Erie, CO (US); Mayur Kudtarkar, Lone Tree, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/010,166

(22) Filed: Jun. 15, 2018

(65) Prior Publication Data

US 2019/0319859 A1 Oct. 17, 2019

Related U.S. Application Data

(60) Provisional application No. 62/657,287, filed on Apr. 13, 2018.

(51) Int. Cl.
*H04L 12/24* (2006.01)
*H04L 29/06* (2006.01)
(Continued)

(52) U.S. Cl.
CPC ............ *H04L 41/16* (2013.01); *G06N 20/00* (2019.01); *G06Q 10/067* (2013.01); *H04L 41/14* (2013.01); *H04L 41/5009* (2013.01); *H04L 41/5025* (2013.01); *H04L 41/5041* (2013.01); *H04L 41/5051* (2013.01); *H04L 63/029* (2013.01); *H04L 63/145* (2013.01)

(58) Field of Classification Search
CPC ....................................................... H04L 41/16
See application file for complete search history.

(56) References Cited

U.S. PATENT DOCUMENTS

2009/0276311 A1* 11/2009 Pujet ................. G06Q 30/0251
705/14.52
2015/0026348 A1* 1/2015 Siddiqui ................... G06F 9/46
709/226

(Continued)

*Primary Examiner* — Nicholas P Celani

(57) ABSTRACT

Novel tools and techniques are provided for provisioning network services, and, more particularly, to methods, systems, and apparatuses for implementing intelligent network services automation. In various embodiments, a computing system might receive one or more network performance metrics of one or more networks, might receive network usage data associated with the one or more networks, and might analyze, using one or more machine learning techniques, the received one or more network performance metrics and the received network usage data to determine whether the one or more networks can be improved in terms of network efficiency or network operations. Based on a determination that the one or more networks can be improved, the computing system might dynamically reconfigure at least one of one or more network connections within the one or more networks or one or more network resources within the one or more networks.

21 Claims, 21 Drawing Sheets

(51) Int. Cl.
*G06N 20/00* (2019.01)
*G06Q 10/06* (2012.01)

(56) References Cited

U.S. PATENT DOCUMENTS

| | | | | |
|---|---|---|---|---|
| 2015/0269605 A1* | 9/2015 | Flood | ............... | G06Q 30/0251 |
| | | | | 705/14.41 |
| 2016/0364772 A1* | 12/2016 | Denton | ............... | G06Q 30/0276 |
| 2017/0078371 A1* | 3/2017 | Kodaypak | ............... | H04W 4/06 |
| 2019/0319852 A1* | 10/2019 | Casey | ............... | H04L 41/14 |
| 2019/0319853 A1* | 10/2019 | Casey | ............... | G06N 20/00 |
| 2019/0319854 A1* | 10/2019 | Casey | ............... | H04L 41/5051 |

* cited by examiner

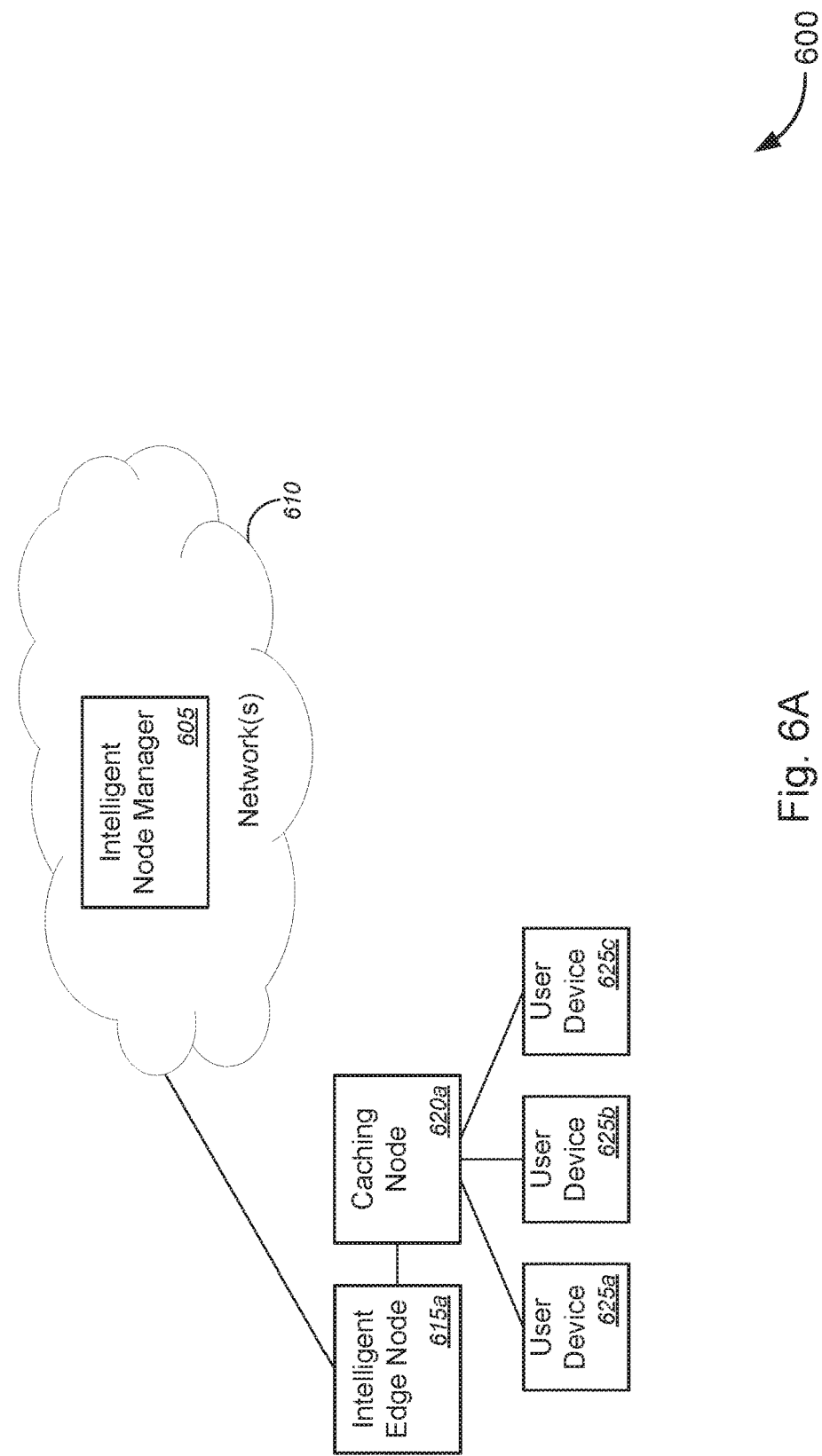

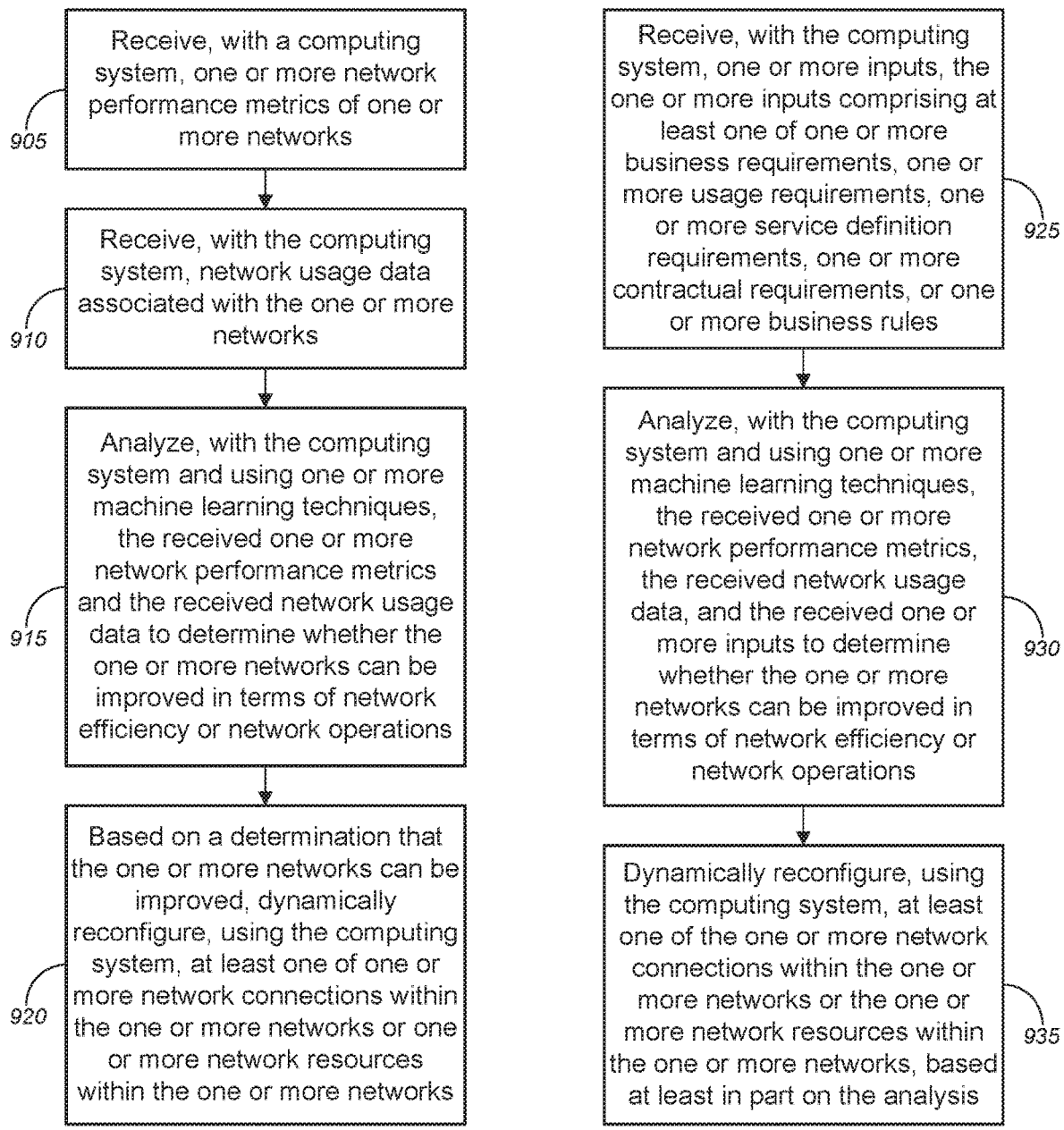

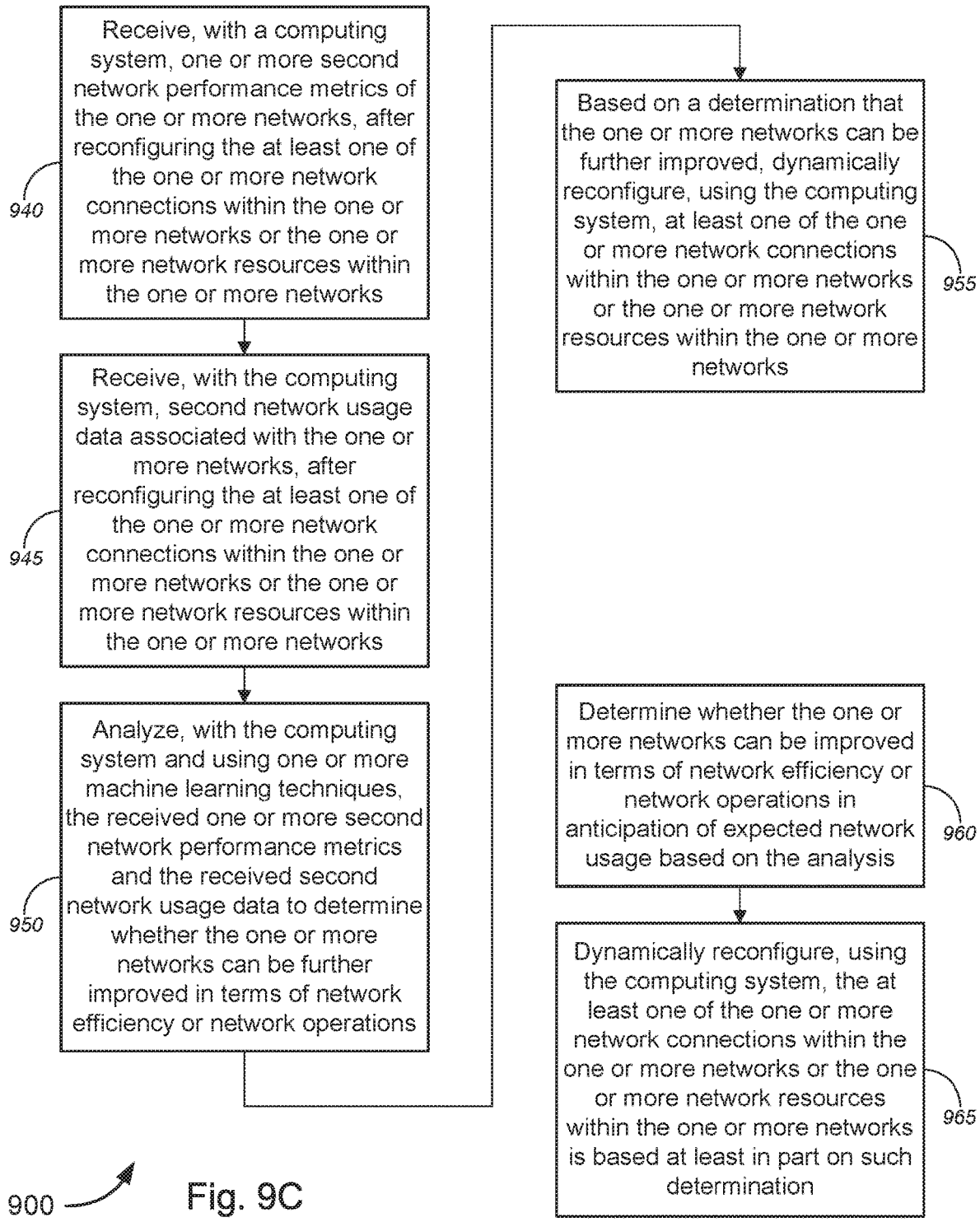

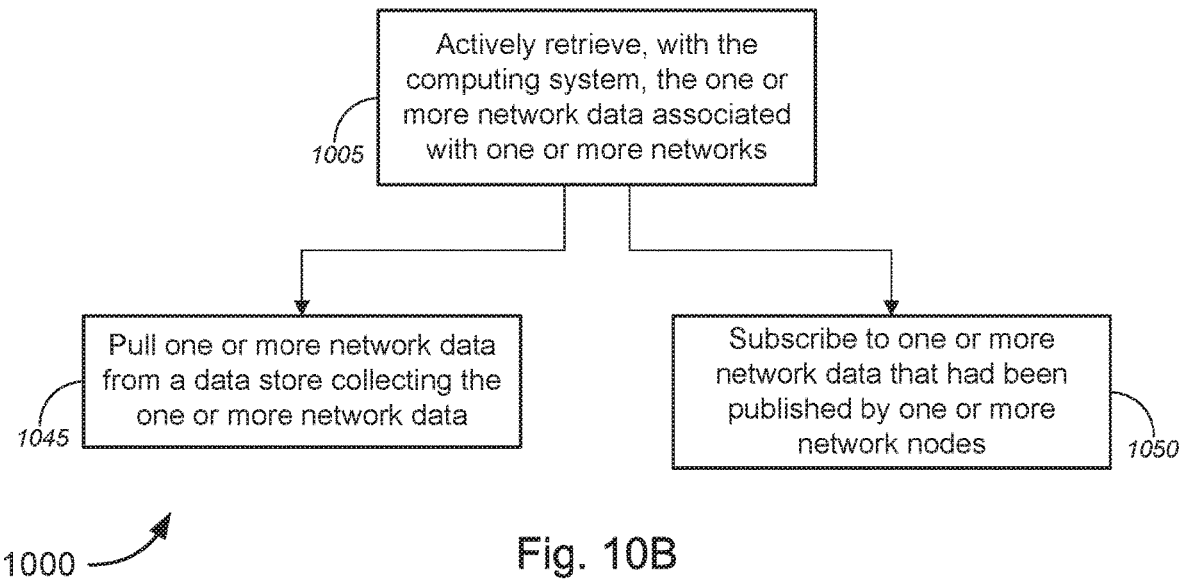
Fig. 10B
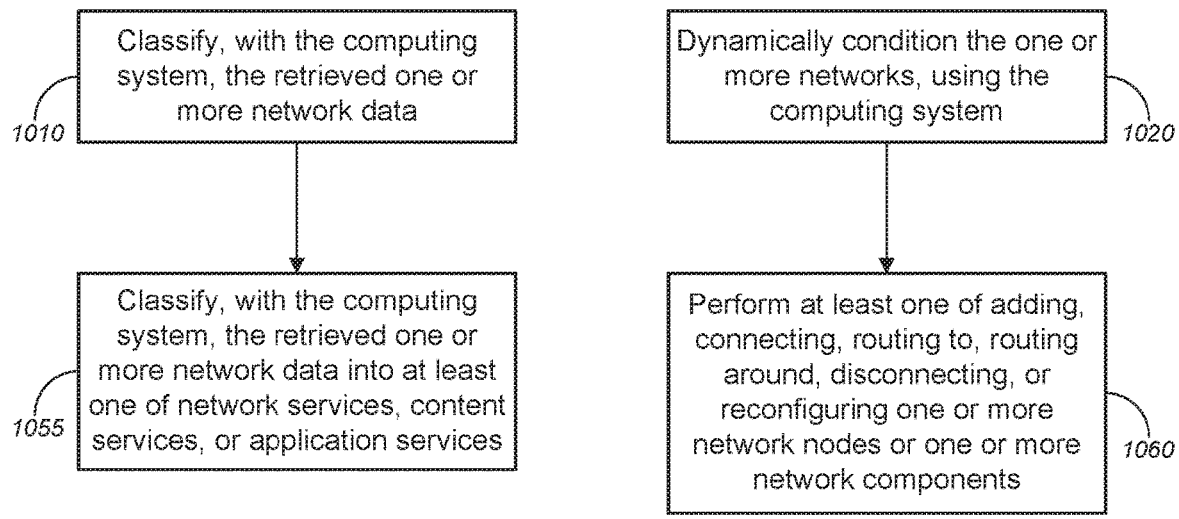
Fig. 10C
Fig. 10D

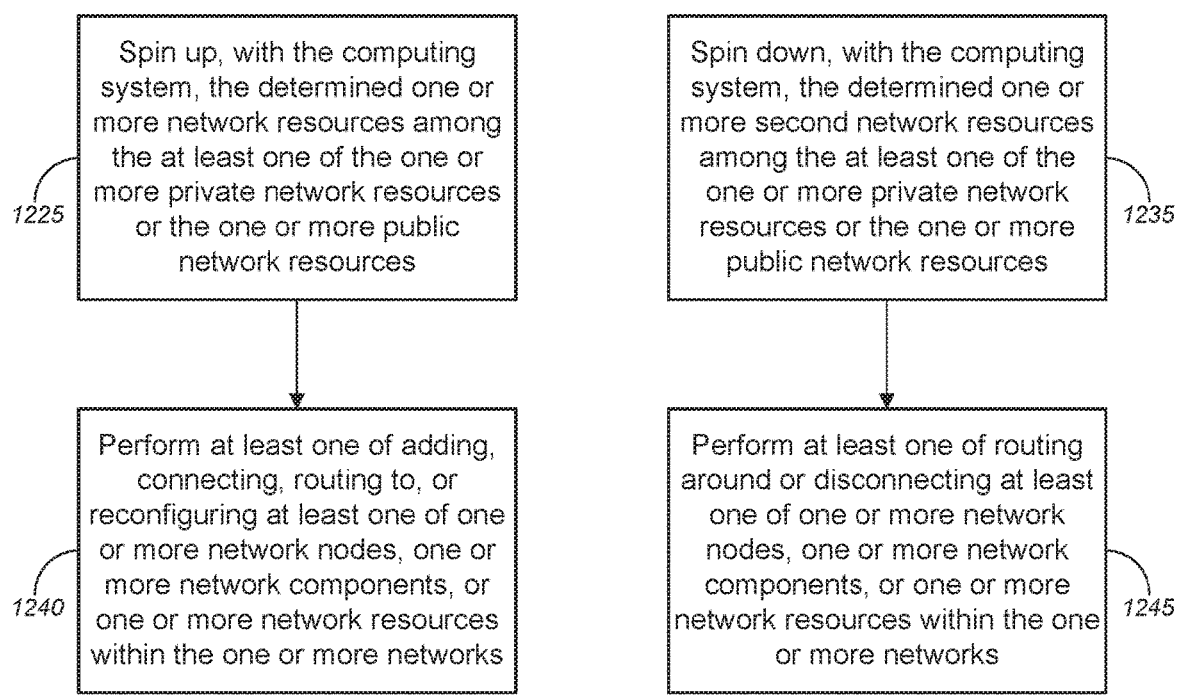

METHOD AND SYSTEM FOR IMPLEMENTING INTELLIGENT NETWORK SERVICES AUTOMATION

CROSS-REFERENCES TO RELATED APPLICATIONS

This application claims priority to U.S. Patent Application Ser. No. 62/657,287 (the "'287 Application"), filed on Apr. 13, 2018 by Steven M. Casey et al., entitled, "Method and System for Implementing Intelligent Network Services Automation," the disclosure of which is incorporated herein by reference in its entirety for all purposes.

This application may be related to each of U.S. patent application Ser. No. 16/010,207 (the "'207 Application"), filed on Jun. 15, 2018 by Steven M. Casey et al., entitled, "Method and System for Implementing Intelligent Network Services Automation," U.S. patent application Ser. No. 16/010,236 (the "'236 Application"), filed on Jun. 15, 2018 by Steven M. Casey et al., entitled, "Method and System for Implementing Intelligent Network Services Automation," and U.S. patent application Ser. No. 16/010,270 (the "'270 Application"), filed on Jun. 15, 2018 by Steven M. Casey et al., entitled, "Method and System for Implementing Intelligent Network Services Automation," each of which claims priority to the '287 Applications, the disclosure of each of which is incorporated herein by reference in their entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for provisioning network services, and, more particularly, to methods, systems, and apparatuses for implementing intelligent network services automation.

BACKGROUND

Network service providers today deploy network services, like content distribution networks ("CDNs"), routers, switches, firewalls, load balancers, and/or the like, based on where the network service providers think or predict the demand for such services will be needed. These predictions are sometimes accurate, but are other times inaccurate. Such prediction and deployment require a large amount of capital and resources, which are not always successful.

Hence, there is a need for more robust and scalable solutions for provisioning network services, and, more particularly, to methods, systems, and apparatuses for implementing intelligent network services automation.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 6A-6C are schematic diagrams illustrating different configurations of a network that is part of a system for implementing intelligent network services automation during different times of a day, in accordance with various embodiments.

FIGS. 9A-9D are flow diagrams illustrating a method for implementing intelligent network services automation, in accordance with various embodiments.

FIGS. 10A-10D are flow diagrams illustrating another method for implementing intelligent network services automation, in accordance with various embodiments.

FIGS. 12A-12C are flow diagrams illustrating still another method for implementing intelligent network services automation, in accordance with various embodiments.

DETAILED DESCRIPTION OF CERTAIN EMBODIMENTS

Overview

Figure 1:
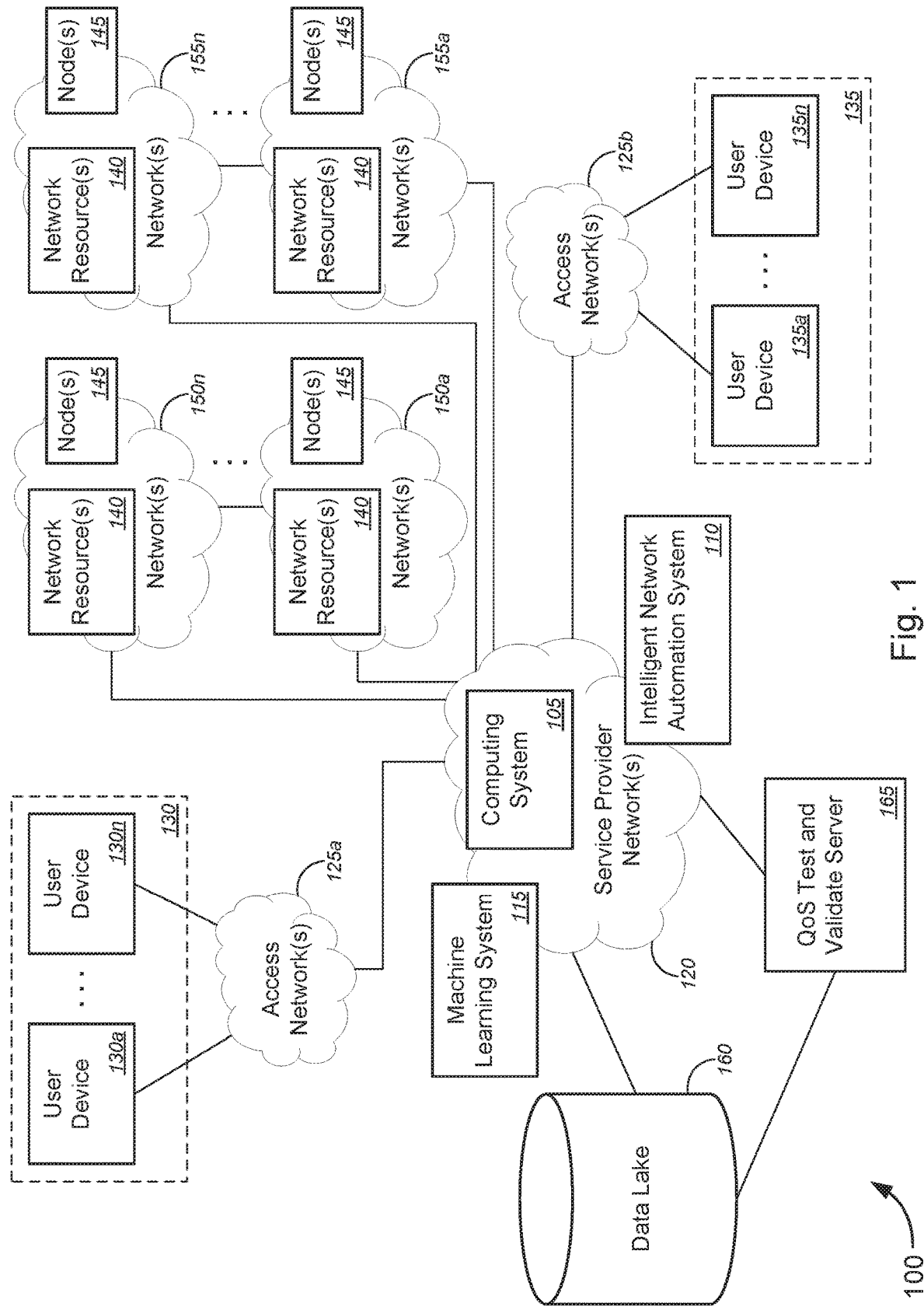
FIG. 1 is a schematic diagram illustrating a system for implementing intelligent network services automation, in accordance with various embodiments.

Various embodiments provide tools and techniques for provisioning network services, and, more particularly, to methods, systems, and apparatuses for implementing intelligent network services automation.

In various embodiments, a computing system (which might include at least one of one or more core network nodes, one or more edge nodes, one or more servers, and/or the like) might receive one or more network performance metrics of one or more networks; might receive network usage data associated with the one or more networks; might analyze, using one or more machine learning techniques, the received one or more network performance metrics and the received network usage data to determine whether the one or more networks can be improved in terms of network efficiency or network operations; and based on a determination that the one or more networks can be improved, might dynamically reconfigure at least one of one or more network connections within the one or more networks or one or more network resources within the one or more networks, and/or the like.

Alternatively, or additionally, the computing system might actively retrieve one or more network data associated with one or more networks; might classify the retrieved one or more network data, which might include classifying the retrieved one or more network data into at least one of network services, content services, or application services, and/or the like; might analyze, using one or more machine learning techniques, the retrieved one or more network data to determine whether the one or more networks can be improved, based at least in part on the classification; and based on a determination that the one or more networks can be improved, might dynamically condition the one or more networks. According to some embodiments, dynamically conditioning the one or more networks might include, without limitation, at least one of adding, connecting, routing to, routing around, disconnecting, or reconfiguring one or more network nodes or one or more network components, and/or the like.

Alternatively, or additionally, the computing system might receive one or more network data associated with one or more networks; might analyze, using one or more machine learning techniques, the received one or more network data to determine how to optimize at least one of the one or more networks or one or more storage services; and might dynamically scale, in real-time, the at least one of the one or more networks or one or more storage services, based on the analysis.

In some embodiments, dynamically scaling the at least one of the one or more networks or the one or more storage services might comprise dynamically scaling, in real-time, the one or more networks to accommodate a combination of current network services provided to the one or more users and future network services as requested or ordered by the one or more users, while maintaining or optimizing the one or more network performance metrics of the one or more networks and while conforming to the one or more business rules. Alternatively, or additionally, dynamically scaling, in real-time, the at least one of the one or more networks or the one or more storage services might comprise at least one of adding, connecting, routing to, or reconfiguring at least one of one or more network nodes, one or more network components, or one or more network resources, dynamically and in real-time, and/or the like. Alternatively, or additionally, dynamically scaling, in real-time, the at least one of the one or more networks or the one or more storage services might comprise at least one of routing around or disconnecting at least one of one or more network nodes, one or more network components, or one or more network resources, dynamically and in real-time. Alternatively, or additionally, dynamically scaling, in real-time, the at least one of the one or more networks or the one or more storage services comprises dynamically scaling the one or more networks to account for changing network usage within predetermined time periods. The predetermined time periods might include, but are not limited to, at least one of one or more predetermined minutes during a work day, one or more predetermined minutes during a weekend day, one or more predetermined hours during a work day, one or more predetermined hours during a weekend day, one or more work days, one or more weekend days, one or more weeks, or one or more months, and/or the like. In some cases, dynamically scaling, with the computing system and in real-time, the at least one of the one or more networks or the one or more storage services might comprise dynamically scaling at least one of one or more network storage devices, one or more content distribution network ("CDN") caches, or one or more data stores, and/or the like.

Alternatively, or additionally, the computing system might receive at least one of one or more requests for network services from one or more users or one or more orders for network services from the one or more users; might receive at least one of one or more network performance metrics of one or more networks or network usage data associated with the one or more networks; might analyze, using one or more machine learning techniques, at least one of the one or more network performance metrics of one or more networks, the network usage data associated with the one or more networks, the one or more requests for network services from the one or more users, the one or more orders for network services from the one or more users, or one or more business rules associated with the one or more networks; might determine, using the one or more machine learning techniques, which one or more network resources among at least one of one or more private network resources or one or more public network resources to spin up in order to service the at least one of the one or more requests for network services or the one or more orders for network services, based at least in part on the analysis; and based on such determination, might spin up the determined one or more network resources among the at least one of the one or more private network resources or the one or more public network resources. In some embodiments, the computing system might also determine, using the one or more machine learning techniques, which one or more second network resources among at least one of the one or more private network resources or the one or more public network resources to spin down in order to release network resources, based at least in part on the analysis; and based on such determination, spin down the determined one or more second network resources among the at least one of the one or more private network resources or the one or more public network resources.

According to some embodiments, the one or more network data might include, without limitation, at least one of one or more network performance metrics of one or more networks, network usage data associated with one or more users who access the one or more networks, one or more requests for network services from the one or more users, one or more orders for network services from the one or more users, or one or more business rules associated with the one or more networks, and/or the like. In some instances, the one or more network performance metrics might include, but are not limited to, at least one of quality of service ("QoS") measurement data, platform resource data and metrics, service usage data, topology and reference data, historical network data, network usage trend data, or data regarding resource costs of network resources, and/or the like. In some cases, the one or more network performance metrics might include, without limitation, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might include, but are not limited to, at least one of service usage data, historical network data, network usage trend data, or network usage data associated with one or more users who access the one or more networks, and/or the like.

To improve the accuracy rate of predictions as to where within a network(s) network services (including, but not limited to, CDNs, routers, switches, firewalls, load balancers, and/or the like) should be deployed to improve efficiency of the network(s), the system (as described in the various embodiments herein) might utilize cloud orchestration and services virtualization without the need for physical, single purpose devices. The system might leverage data obtained from large datasets about network resource usage (also referred to as "big data" or the like) and/or machine learning algorithms with such cloud orchestration and services virtualization to intelligently and dynamically build network architectures based on rule sets. These networks can thus change dynamically on a daily basis based at least in part on business rules, costs, usage, and/or any other rules. In sum, large datasets may be applied with machine learning algorithms to dynamically build networks using cloud orchestration methods, so that the networks can configure themselves based on customer usage, which can change on an hourly basis. In effect, the system, as described herein, can cause the networks to dynamically change their configurations in real-time, based on any set of rules.

These and other functionalities are described in detail below with respect to FIGS. 1-14.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or delivery technology, network optimization technology, network configuration technology, and/or the like. In other aspects, certain embodiments can improve the functioning of user equipment or systems themselves (e.g., network hardware, network nodes, media content streaming or delivery systems, network configuration systems, etc.), for example, by analyzing, with the computing system and using one or more machine learning techniques, received one or more network performance metrics and received network usage data to determine whether the one or more networks can be improved in terms of network efficiency or network operations; and based on a determination that the one or more networks can be improved, dynamically reconfiguring, using the computing system, at least one of one or more network connections within the one or more networks or one or more network resources within the one or more networks; and/or the like. Alternatively, or additionally, certain embodiments can improve the functioning of user equipment or systems themselves (e.g., network hardware, network nodes, media content streaming or delivery systems, network configuration systems, etc.), for example, by classifying, with the computing system, retrieved one or more network data; analyzing, with the computing system and using one or more machine learning techniques, the retrieved one or more network data to determine whether the one or more networks can be improved, based at least in part on the classification; and based on a determination that the one or more networks can be improved, dynamically conditioning the one or more networks, using the computing system; and/or the like. Alternatively, or additionally, certain embodiments can improve the functioning of user equipment or systems themselves (e.g., network hardware, network nodes, media content streaming or delivery systems, network configuration systems, etc.), for example, by analyzing, with the computing system and using one or more machine learning techniques, received one or more network data to determine how to optimize at least one of the one or more networks or one or more storage services; and dynamically scaling, with the computing system and in real-time, the at least one of the one or more networks or the one or more storage services, based on the analysis. Alternatively, or additionally, certain embodiments can improve the functioning of user equipment or systems themselves (e.g., network hardware, network nodes, media content streaming or delivery systems, network configuration systems, etc.), for example, by analyzing, with the computing system and using one or more machine learning techniques, at least one of one or more network performance metrics of one or more networks, network usage data associated with the one or more networks, one or more requests for network services from the one or more users, one or more orders for network services from the one or more users, or one or more business rules associated with the one or more networks; determining, with the computing system and using the one or more machine learning techniques, which one or more network resources among at least one of one or more private network resources or one or more public network resources to spin up in order to service the at least one of the one or more requests for network services or the one or more orders for network services, based at least in part on the analysis; and based on such determination, spinning up, with the computing system, the determined one or more network resources among the at least one of the one or more private network resources or the one or more public network resources; and/or the like.

In particular, to the extent any abstract concepts are present in the various embodiments, those concepts can be implemented as described herein by devices, software, systems, and methods that involve specific novel functionality (e.g., steps or operations), such as, in response to analysis by the computing system and using machine learning techniques, the computing system determines how to improve the efficiency of the network in part or as a whole, and based on such determination, the computing system performs at least one of dynamically reconfiguring at least one of one or more network connections within one or more networks or one or more network resources within the one or more networks, dynamically conditioning one or more networks, dynamically scaling (in real-time) at least one of the one or more networks or the one or more storage services, or spinning up or down determined one or more network resources among at least one of the one or more private network resources or the one or more public network resources, and/or the like, to name a few examples, that extend beyond mere conventional computer processing operations. These functionalities can produce tangible results outside of the implementing computer system, including, merely by way of example, optimized functioning of the network thus providing for more efficient utilization of the network by users, and/or the like, at least some of which may be observed or measured by users and/or service providers.

In an aspect, a method might comprise receiving, with a computing system, one or more network performance metrics of one or more networks; and receiving, with the computing system, network usage data associated with the one or more networks. The method might also comprise analyzing, with the computing system and using one or more machine learning techniques, the received one or more network performance metrics and the received network usage data to determine whether the one or more networks can be improved in terms of network efficiency or network operations. The method might further comprise, based on a determination that the one or more networks can be improved, dynamically reconfiguring, using the computing system, at least one of one or more network connections within the one or more networks or one or more network resources within the one or more networks.

In some embodiments, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might comprise at least one of service usage data, historical network data, network usage trend data, or network usage data associated with one or more users who access the one or more networks, and/or the like.

According to some embodiments, the method might further comprise receiving, with the computing system, one or more inputs, the one or more inputs comprising at least one of one or more business requirements, one or more usage requirements, one or more service definition requirements, one or more contractual requirements, or one or more business rules; and analyzing, with the computing system and using one or more machine learning techniques, the received one or more network performance metrics, the received network usage data, and the received one or more inputs to determine whether the one or more networks can be improved in terms of network efficiency or network operations. In some instances, dynamically reconfiguring the at least one of the one or more network connections within the one or more networks or the one or more network resources within the one or more networks might comprise dynamically reconfiguring, using the computing system, at least one of the one or more network connections within the one or more networks or the one or more network resources within the one or more networks, based at least in part on the analysis.

In some embodiments, the method might further comprise receiving, with the computing system, one or more second network performance metrics of the one or more networks, after reconfiguring the at least one of the one or more network connections within the one or more networks or the one or more network resources within the one or more networks; receiving, with the computing system, second network usage data associated with the one or more networks, after reconfiguring the at least one of the one or more network connections within the one or more networks or the one or more network resources within the one or more networks; analyzing, with the computing system and using one or more machine learning techniques, the received one or more second network performance metrics and the received second network usage data to determine whether the one or more networks can be further improved in terms of network efficiency or network operations; and based on a determination that the one or more networks can be further improved, dynamically reconfiguring, using the computing system, at least one of the one or more network connections within the one or more networks or the one or more network resources within the one or more networks.

According to some embodiments, determining whether the one or more networks can be improved in terms of network efficiency or network operations might comprise determining whether the one or more networks can be improved in terms of network efficiency or network operations in anticipation of expected network usage based on the analysis, wherein dynamically reconfiguring the at least one of the one or more network connections within the one or more networks or the one or more network resources within the one or more networks might be based at least in part on such determination.

In some embodiments, dynamically reconfiguring the at least one of the one or more network connections within the one or more networks or the one or more network resources within the one or more networks might be limited by one or more thresholds. In some cases, the one or more thresholds might comprise at least one of one or more customer-defined thresholds, one or more confirmation-seeking thresholds, or one or more system-wide thresholds, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive one or more network performance metrics of one or more networks; receive network usage data associated with the one or more networks; analyze, using one or more machine learning techniques, the received one or more network performance metrics and the received network usage data to determine whether the one or more networks can be improved in terms of network efficiency or network operations; and based on a determination that the one or more networks can be improved, dynamically reconfigure at least one of one or more network connections within the one or more networks or one or more network resources within the one or more networks.

In some embodiments, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might comprise at least one of service usage data, historical network data, network usage trend data, or network usage data associated with one or more users who access the one or more networks, and/or the like.

According to some embodiments, the set of instructions, when executed by the at least one processor, might further cause the apparatus to: receive one or more inputs, the one or more inputs comprising at least one of one or more business requirements, one or more usage requirements, one or more service definition requirements, one or more contractual requirements, or one or more business rules; and analyze, using one or more machine learning techniques, the received one or more network performance metrics, the received network usage data, and the received one or more inputs to determine whether the one or more networks can be improved in terms of network efficiency or network operations. In some instances, dynamically reconfiguring the at least one of the one or more network connections within the one or more networks or the one or more network resources within the one or more networks might comprise dynamically reconfiguring at least one of the one or more network connections within the one or more networks or the one or more network resources within the one or more networks, based at least in part on the analysis.

In some embodiments, the set of instructions, when executed by the at least one processor, might further cause the apparatus to: receive one or more second network performance metrics of the one or more networks, after reconfiguring the at least one of the one or more network connections within the one or more networks or the one or more network resources within the one or more networks; receive second network usage data associated with the one or more networks, after reconfiguring the at least one of the one or more network connections within the one or more networks or the one or more network resources within the one or more networks; analyze, using one or more machine learning techniques, the received one or more second network performance metrics and the received second network usage data to determine whether the one or more networks can be further improved in terms of network efficiency or network operations; and based on a determination that the one or more networks can be further improved, dynamically reconfigure at least one of the one or more network connections within the one or more networks or the one or more network resources within the one or more networks.

According to some embodiments, determining whether the one or more networks can be improved in terms of network efficiency or network operations might comprise determining whether the one or more networks can be improved in terms of network efficiency or network operations in anticipation of expected network usage based on the analysis, wherein dynamically reconfiguring the at least one of the one or more network connections within the one or more networks or the one or more network resources within the one or more networks might be based at least in part on such determination.

In some embodiments, dynamically reconfiguring the at least one of the one or more network connections within the one or more networks or the one or more network resources within the one or more networks might be limited by one or more thresholds. In some cases, the one or more thresholds might comprise at least one of one or more customer-defined thresholds, one or more confirmation-seeking thresholds, or one or more system-wide thresholds, and/or the like.

In yet another aspect, a system might comprise a computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive one or more network performance metrics of one or more networks; receive network usage data associated with the one or more networks; analyze, using one or more machine learning techniques, the received one or more network performance metrics and the received network usage data to determine whether the one or more networks can be improved in terms of network efficiency or network operations; and based on a determination that the one or more networks can be improved, dynamically reconfigure at least one of one or more network connections within the one or more networks or one or more network resources within the one or more networks.

In some embodiments, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might comprise at least one of service usage data, historical network data, network usage trend data, or network usage data associated with one or more users who access the one or more networks, and/or the like.

According to some embodiments, the first set of instructions, when executed by the at least one first processor, might further cause the computing system to: receive one or more inputs, the one or more inputs comprising at least one of one or more business requirements, one or more usage requirements, one or more service definition requirements, one or more contractual requirements, or one or more business rules; and analyze, using one or more machine learning techniques, the received one or more network performance metrics, the received network usage data, and the received one or more inputs to determine whether the one or more networks can be improved in terms of network efficiency or network operations. In some instances, dynamically reconfiguring the at least one of the one or more network connections within the one or more networks or the one or more network resources within the one or more networks might comprise dynamically reconfiguring at least one of the one or more network connections within the one or more networks or the one or more network resources within the one or more networks, based at least in part on the analysis.

In some embodiments, the first set of instructions, when executed by the at least one first processor, might further cause the computing system to: receive one or more second network performance metrics of the one or more networks, after reconfiguring the at least one of the one or more network connections within the one or more networks or the one or more network resources within the one or more networks; receive second network usage data associated with the one or more networks, after reconfiguring the at least one of the one or more network connections within the one or more networks or the one or more network resources within the one or more networks; analyze, using one or more machine learning techniques, the received one or more second network performance metrics and the received second network usage data to determine whether the one or more networks can be further improved in terms of network efficiency or network operations; and based on a determination that the one or more networks can be further improved, dynamically reconfigure at least one of the one or more network connections within the one or more networks or the one or more network resources within the one or more networks.

According to some embodiments, determining whether the one or more networks can be improved in terms of network efficiency or network operations might comprise determining whether the one or more networks can be improved in terms of network efficiency or network operations in anticipation of expected network usage based on the analysis, wherein dynamically reconfiguring the at least one of the one or more network connections within the one or more networks or the one or more network resources within the one or more networks might be based at least in part on such determination.

In some embodiments, dynamically reconfiguring the at least one of the one or more network connections within the one or more networks or the one or more network resources within the one or more networks might be limited by one or more thresholds. In some cases, the one or more thresholds might comprise at least one of one or more customer-defined thresholds, one or more confirmation-seeking thresholds, or one or more system-wide thresholds, and/or the like.

In an aspect, a method might comprise actively retrieving, with a computing system, one or more network data associated with one or more networks; classifying, with the computing system, the retrieved one or more network data; and analyzing, with the computing system and using one or more machine learning techniques, the retrieved one or more network data to determine whether the one or more networks can be improved, based at least in part on the classification. The method might further comprise, based on a determination that the one or more networks can be improved, dynamically conditioning the one or more networks, using the computing system.

In some embodiments, actively retrieving the one or more network data might comprise one of pulling one or more network data from a data store collecting the one or more network data or subscribing to one or more network data that had been published by one or more network nodes, and/or the like. According to some embodiments, classifying the retrieved one or more network data might comprise classifying the retrieved one or more network data into at least one of network services, content services, security services, or application services, and/or the like. The network services might comprise at least one of routing services, firewall services, or switching services, and/or the like. The content services might comprise at least one of content distribution services, caching services, transcoding services, content packaging services, manifest manipulation, or application acceleration services, and/or the like. The security services might comprise at least one of web application firewalls, protection against distributed denial of service ("DDOS") attacks, or signature identification for viruses and malware, and/or the like. The application services might comprise at least one of web server services, payment system services, billing system services, gaming services, streaming services, or e-commerce server services, and/or the like.

According to some embodiments, the one or more network data might comprise at least one of one or more network performance metrics of one or more networks, network usage data associated with one or more users who access the one or more networks, or one or more requests for network services from the one or more users, and/or the like. In some instances, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might comprise at least one of service usage data, historical network data, network usage trend data, or network usage data associated with one or more users who access the one or more networks, and/or the like. In some cases, dynamically conditioning the one or more networks might comprise at least one of adding, connecting, routing to, routing around, disconnecting, or reconfiguring one or more network nodes or one or more network components, and/or the like.

In some embodiments, the method might further comprise: actively retrieving, with the computing system, one or more second network data associated with the one or more networks, after dynamically conditioning the one or more networks; classifying, with the computing system, the retrieved one or more network data, after dynamically conditioning the one or more networks; analyzing, with the computing system and using one or more machine learning techniques, the retrieved one or more second network data to determine whether the one or more networks can be further improved, based at least in part on the classification;

and based on a determination that the one or more networks can be further improved, dynamically conditioning the one or more networks, using the computing system.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: actively retrieve one or more network data associated with one or more networks; classify the retrieved one or more network data; analyze, using one or more machine learning techniques, the retrieved one or more network data to determine whether the one or more networks can be improved, based at least in part on the classification; and based on a determination that the one or more networks can be improved, dynamically condition the one or more networks.

In some embodiments, actively retrieving the one or more network data might comprise one of pulling one or more network data from a data store collecting the one or more network data or subscribing to one or more network data that had been published by one or more network nodes, and/or the like. According to some embodiments, classifying the retrieved one or more network data might comprise classifying the retrieved one or more network data into at least one of network services, content services, security services, or application services, and/or the like. The network services might comprise at least one of routing services, firewall services, or switching services, and/or the like. The content services might comprise at least one of content distribution services, caching services, transcoding services, content packaging services, manifest manipulation, or application acceleration services, and/or the like. The security services might comprise at least one of web application firewalls, protection against distributed denial of service ("DDOS") attacks, or signature identification for viruses and malware, and/or the like. The application services might comprise at least one of web server services, payment system services, billing system services, gaming services, streaming services, or e-commerce server services, and/or the like.

According to some embodiments, the one or more network data might comprise at least one of one or more network performance metrics of one or more networks, network usage data associated with one or more users who access the one or more networks, or one or more requests for network services from the one or more users, and/or the like. In some instances, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might comprise at least one of service usage data, historical network data, network usage trend data, or network usage data associated with one or more users who access the one or more networks, and/or the like. In some cases, dynamically conditioning the one or more networks might comprise at least one of adding, connecting, routing to, routing around, disconnecting, or reconfiguring one or more network nodes or one or more network components, and/or the like.

In some embodiments, the set of instructions, when executed by the at least one processor, might further cause the apparatus to: actively retrieve one or more second network data associated with the one or more networks, after dynamically conditioning the one or more networks; classify the retrieved one or more network data, after dynamically conditioning the one or more networks; analyze, using one or more machine learning techniques, the retrieved one or more second network data to determine whether the one or more networks can be further improved, based at least in part on the classification; and based on a determination that the one or more networks can be further improved, dynamically condition the one or more networks.

In yet another aspect, a system might comprise a computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: actively retrieve one or more network data associated with one or more networks; classify the retrieved one or more network data; analyze, using one or more machine learning techniques, the retrieved one or more network data to determine whether the one or more networks can be improved, based at least in part on the classification; and based on a determination that the one or more networks can be improved, dynamically condition the one or more networks.

In an aspect, a method might comprise receiving, with a computing system, one or more network data associated with one or more networks; analyzing, with the computing system and using one or more machine learning techniques, the received one or more network data to determine how to optimize at least one of the one or more networks or one or more storage services; and dynamically scaling, with the computing system and in real-time, the at least one of the one or more networks or the one or more storage services, based on the analysis.

According to some embodiments, the one or more network data might comprise at least one of one or more network performance metrics of one or more networks, network usage data associated with one or more users who access the one or more networks, one or more requests for network services from the one or more users, one or more orders for network services from the one or more users, or one or more business rules associated with the one or more networks, and/or the like. In some instances, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might comprise at least one of service usage data, historical network data, network usage trend data, or network usage data associated with one or more users who access the one or more networks, and/or the like.

Merely by way of example, in some embodiments, dynamically scaling the at least one of the one or more networks or the one or more storage services might comprise dynamically scaling, with the computing system and in real-time, the one or more networks to accommodate a combination of current network services provided to the one or more users and future network services as requested or ordered by the one or more users, while maintaining or optimizing the one or more network performance metrics of the one or more networks and while conforming to the one or more business rules. Alternatively, or additional, dynamically scaling, with the computing system and in real-time, the at least one of the one or more networks or the one or more storage services might comprise at least one of adding, connecting, routing to, or reconfiguring at least one of one or more network nodes, one or more network components, or one or more network resources, and/or the like, dynamically and in real-time. Alternatively, or additional, dynamically scaling, with the computing system and in real-time, the at least one of the one or more networks or the one or more storage services might comprise at least one of routing around or disconnecting at least one of one or more network nodes, one or more network components, or one or more network resources, and/or the like, dynamically and in real-time. Alternatively, or additional, dynamically scaling, with the computing system and in real-time, the at least one of the one or more networks or the one or more storage services might comprise dynamically scaling the one or more networks to account for changing network usage within predetermined time periods. The predetermined time periods might comprise at least one of one or more predetermined minutes during a work day, one or more predetermined minutes during a weekend day, one or more predetermined hours during a work day, one or more predetermined hours during a weekend day, one or more work days, one or more weekend days, one or more weeks, or one or more months, and/or the like. In some cases, dynamically scaling, with the computing system and in real-time, the at least one of the one or more networks or the one or more storage services might comprise dynamically scaling at least one of one or more network storage devices, one or more content distribution network ("CDN") caches, or one or more data stores, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive one or more network data associated with one or more networks; analyze, using one or more machine learning techniques, the received one or more network data to determine how to optimize at least one of the one or more networks or one or more storage services; and dynamically scale, in real-time, the at least one of the one or more networks or the one or more storage services, based on the analysis.

According to some embodiments, the one or more network data might comprise at least one of one or more network performance metrics of one or more networks, network usage data associated with one or more users who access the one or more networks, one or more requests for network services from the one or more users, one or more orders for network services from the one or more users, or one or more business rules associated with the one or more networks, and/or the like. In some instances, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might comprise at least one of service usage data, historical network data, network usage trend data, or network usage data associated with one or more users who access the one or more networks, and/or the like.

Merely by way of example, in some embodiments, dynamically scaling the at least one of the one or more networks or the one or more storage services might comprise dynamically scaling, in real-time, the one or more networks to accommodate a combination of current network services provided to the one or more users and future network services as requested or ordered by the one or more users, while maintaining or optimizing the one or more network performance metrics of the one or more networks and while conforming to the one or more business rules. Alternatively, or additional, dynamically scaling, in real-time, the at least one of the one or more networks or the one or more storage services might comprise at least one of adding, connecting, routing to, or reconfiguring at least one of one or more network nodes, one or more network components, or one or more network resources, and/or the like, dynamically and in real-time. Alternatively, or additional, dynamically scaling, in real-time, the at least one of the one or more networks or the one or more storage services might comprise at least one of routing around or disconnecting at least one of one or more network nodes, one or more network components, or one or more network resources, and/or the like, dynamically and in real-time. Alternatively, or additional, dynamically scaling, in real-time, the at least one of the one or more networks or the one or more storage services might comprise dynamically scaling the one or more networks to account for changing network usage within predetermined time periods. The predetermined time periods might comprise at least one of one or more predetermined minutes during a work day, one or more predetermined minutes during a weekend day, one or more predetermined hours during a work day, one or more predetermined hours during a weekend day, one or more work days, one or more weekend days, one or more weeks, or one or more months, and/or the like. In some cases, dynamically scaling, with the computing system and in real-time, the at least one of the one or more networks or the one or more storage services might comprise dynamically scaling at least one of one or more network storage devices, one or more content distribution network ("CDN") caches, or one or more data stores, and/or the like.

In yet another aspect, a system might comprise a computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive one or more network data associated with one or more networks; analyze, using one or more machine learning techniques, the received one or more network data to determine how to optimize at least one of the one or more networks or one or more storage services; and dynamically scale, in real-time, the at least one of the one or more networks or the one or more storage services, based on the analysis.

In an aspect, a method might comprise receiving, with a computing system, at least one of one or more requests for network services from one or more users or one or more orders for network services from the one or more users; and receiving, with the computing system, at least one of one or more network performance metrics of one or more networks or network usage data associated with the one or more networks. The method might also comprise analyzing, with the computing system and using one or more machine learning techniques, at least one of the one or more network performance metrics of one or more networks, the network usage data associated with the one or more networks, the one or more requests for network services from the one or more users, the one or more orders for network services from the one or more users, or one or more business rules associated with the one or more networks; and determining, with the computing system and using the one or more machine learning techniques, which one or more network resources among at least one of one or more private network resources or one or more public network resources to spin up in order to service the at least one of the one or more requests for network services or the one or more orders for network services, based at least in part on the analysis. The method might further comprise, based on such determination, spinning up, with the computing system, the determined one or more network resources among the at least one of the one or more private network resources or the one or more public network resources.

In some embodiments, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data associated with the one or more networks might comprise at least one of service usage data, historical network data, network usage trend data, or network usage data associated with one or more users who access the one or more networks, and/or the like.

According to some embodiments, the method might further comprise determining, with the computing system and using the one or more machine learning techniques, which one or more second network resources among at least one of the one or more private network resources or the one or more public network resources to spin down in order to release network resources, based at least in part on the analysis; and based on such determination, spinning down, with the computing system, the determined one or more second network resources among the at least one of the one or more private network resources or the one or more public network resources. In some cases, spinning down the determined one or more second network resources might comprise at least one of routing around or disconnecting at least one of one or more network nodes, one or more network components, or one or more network resources within the one or more networks, and/or the like. In some instances, spinning up the determined one or more network resources might comprise at least one of adding, connecting, routing to, or reconfiguring at least one of one or more network nodes, one or more network components, or one or more network resources within the one or more networks, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive at least one of one or more requests for network services from one or more users or one or more orders for network services from the one or more users; receive at least one of one or more network performance metrics of one or more networks or network usage data associated with the one or more networks; analyze, using one or more machine learning techniques, at least one of the one or more network performance metrics of one or more networks, the network usage data associated with the one or more networks, the one or more requests for network services from the one or more users, the one or more orders for network services from the one or more users, or one or more business rules associated with the one or more networks; determine, using the one or more machine learning techniques, which one or more network resources among at least one of one or more private network resources or one or more public network resources to spin up in order to service the at least one of the one or more requests for network services or the one or more orders for network services, based at least in part on the analysis; and based on such determination, spin up the determined one or more network resources among the at least one of the one or more private network resources or the one or more public network resources.

In some embodiments, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data associated with the one or more networks might comprise at least one of service usage data, historical network data, network usage trend data, or network usage data associated with one or more users who access the one or more networks, and/or the like.

According to some embodiments, the set of instructions, when executed by the at least one processor, might further cause the apparatus to: determine, using the one or more machine learning techniques, which one or more second network resources among at least one of the one or more private network resources or the one or more public network resources to spin down in order to release network resources, based at least in part on the analysis; and based on such determination, spin down the determined one or more second network resources among the at least one of the one or more private network resources or the one or more public network resources. In some cases, spinning down the determined one or more second network resources might comprise at least one of routing around or disconnecting at least one of one or more network nodes, one or more network components, or one or more network resources within the one or more networks, and/or the like. In some instances, spinning up the determined one or more network resources might comprise at least one of adding, connecting, routing to, or reconfiguring at least one of one or more network nodes, one or more network components, or one or more network resources within the one or more networks, and/or the like.

In yet another aspect, a system might comprise a computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive at least one of one or more requests for network services from one or more users or one or more orders for network services from the one or more users; receive at least one of one or more network performance metrics of one or more networks or network usage data associated with the one or more networks; analyze, using one or more machine learning techniques, at least one of the one or more network performance metrics of one or more networks, the network usage data associated with the one or more networks, the one or more requests for network services from the one or more users, the one or more orders for network services from the one or more users, or one or more business rules associated with the one or more networks; determine, using the one or more machine learning techniques, which one or more network resources among at least one of one or more private network resources or one or more public network resources to spin up in order to service the at least one of the one or more requests for network services or the one or more orders for network services, based at least in part on the analysis; and based on such determination, spin up the determined one or more network resources among the at least one of the one or more private network resources or the one or more public network resources.

In some embodiments, the one or more network performance metrics might comprise at least one of quality of service ("QoS") measurement data, platform resource data and metrics, service usage data, topology and reference data, historical network data, network usage trend data, or data regarding resource costs of network resources, and/or the like. In some cases, the one or more network performance metrics might comprise one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data associated with the one or more networks might comprise at least one of service usage data, historical network data, network usage trend data, or network usage data associated with one or more users who access the one or more networks, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-14 illustrate some of the features of the method, system, and apparatus for provisioning network services, and, more particularly, to methods, systems, and apparatuses for implementing intelligent network services automation, as referred to above. The methods, systems, and apparatuses illustrated by FIGS. 1-14 refer to examples of different embodiments that include various components and steps, which can be considered alternatives or which can be used in conjunction with one another in the various embodiments. The description of the illustrated methods, systems, and apparatuses shown in FIGS. 1-14 is provided for purposes of illustration and should not be considered to limit the scope of the different embodiments.

With reference to the figures, FIG. 1 is a schematic diagram illustrating a system 100 for implementing intelligent network services automation, in accordance with various embodiments.

In the non-limiting embodiment of FIG. 1, system 100 might comprise a computing system 105, an intelligent network automation system 110, and a machine learning system 115, all of which might be located within a service provider network(s) 120. System 100 might further comprise one or more access networks 125a and/or 125b (collectively, "access networks 125" or the like). One or more user devices 130a-130n (collectively, "user devices 130" or the like) and/or 135a-135n (collectively, "user devices 135" or the like) might be communicatively coupled to the access networks 125. System 100 might further comprise one or more network resources 140 and one or more nodes 145, which might be located within one or more networks 150a-150n (collectively, "networks 150" or the like) and/or within one or more networks 155a-155n (collectively, "networks 155" or the like). Each of the networks 150 and 155 might be communicatively coupled with service provider network(s) 120. System 100 might further comprise a data lake 160 and a quality of service ("QoS") test and validate server 165 that are either located within service provider network(s) 120 or otherwise communicatively coupled with service provider network(s) 120.

In operation, a computing system (which might include at least one of the computing system 105, the intelligent network automation system 110, or the machine learning system 115, and/or the like) might receive one or more network performance metrics of one or more networks 150 or 155 (in some cases, via nodes 145 or the like); might receive network usage data associated with the one or more networks 150 or 155 (in some cases, via nodes 145, via user devices 130 or 135, or the like); might analyze, using one or more machine learning techniques (and using at least one of the machine learning system 115 or the QoS test and validate server 165, and/or the like), the received one or more network performance metrics and the received network usage data to determine whether the one or more networks can be improved in terms of network efficiency or network operations; and based on a determination that the one or more networks 150 or 155 can be improved, might dynamically reconfigure (via intelligent network automation system 110, or the like) at least one of one or more network connections within the one or more networks 150 or 155 or one or more network resources 140 within the one or more networks 150 or 155, and/or the like.

According to some embodiments, dynamically reconfiguring the at least one of the one or more network connections within the one or more networks or the one or more network resources within the one or more networks might be limited by one or more thresholds. In some cases, the one or more thresholds might comprise at least one of one or more customer-defined thresholds, one or more confirmation-seeking thresholds, or one or more system-wide thresholds, and/or the like. Some non-limiting examples of the one or more customer-defined thresholds might include, but are not limited to, allowing from 5 Mbps to 20 Mbps variance in services or provisioning between 2-4 compute nodes, and/or the like. Non-limiting examples of the one or more confirmation-seeking thresholds might include, without limitation, sending a notification at each 5 Mbps increase with a requirement for confirmation or approval before making the change, notifying a user each time a compute node is being added (and requiring confirmation for such addition), or requiring confirmation after 5 nodes are added before any more can be added, and/or the like. Some non-limiting examples of system-wide thresholds might include, but are not limited to, preventing any one user or customer from taking up most or all of the resources in an edge node or the core network, and/or the like.

In some embodiments, the one or more network performance metrics might include, without limitation, at least one of quality of service ("QoS") measurement data, platform resource data and metrics, service usage data, topology and reference data, historical network data, network usage trend data, or data regarding resource costs of network resources, and/or the like. According to some embodiments, the one or more network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some cases, the network usage data might include, without limitation, at least one of service usage data, historical network data, network usage trend data, or network usage data associated with one or more users who access the one or more networks, and/or the like.

Alternatively, or additionally, the computing system (which might include at least one of the computing system 105, the intelligent network automation system 110, or the machine learning system 115, and/or the like) might actively retrieve one or more network data associated with one or more networks 150 or 155 (in some cases, via nodes 145 or the like); might classify the retrieved one or more network data, which might include classifying the retrieved one or more network data into at least one of network services, content services, or application services, and/or the like; might analyze, using one or more machine learning techniques (and using at least one of the machine learning system 115 or the QoS test and validate server 165, and/or the like), the retrieved one or more network data to determine whether the one or more networks can be improved, based at least in part on the classification; and based on a determination that the one or more networks can be improved, might dynamically condition the one or more networks 150 or 155. According to some embodiments, dynamically conditioning the one or more networks might include, without limitation, at least one of adding, connecting, routing to, routing around, disconnecting, or reconfiguring one or more network nodes or one or more network components, and/or the like.

According to some embodiments, actively retrieving the one or more network data might include, without limitation, one of pulling one or more network data from a data store collecting the one or more network data or subscribing to one or more network data that had been published by one or more network nodes, and/or the like. In some cases, classifying the retrieved one or more network data might include, but are not limited to, classifying the retrieved one or more network data into at least one of network services, content services, security services, or application services, and/or the like. The network services might include, without limitation, at least one of routing services, firewall services, or switching services, and/or the like. The content services might include, but are not limited to, at least one of content distribution services, caching services, transcoding services, content packaging services (e.g., HTTP live streaming ("HLS"), dynamic adaptive streaming over HTTP ("DASH"), HTTP smooth streaming ("HSS"), etc.), manifest manipulation, or application acceleration services, and/or the like. The security services might include, but are not limited to, at least one of web application firewalls, protection against distributed denial of service ("DDOS") attacks, or signature identification for viruses and malware, and/or the like. The application services might include, without limitation, at least one of web server services, payment system services, billing system services, gaming services, streaming services, or e-commerce server services, and/or the like. In some instances, the one or more network data might include, but are not limited to, at least one of one or more network performance metrics of one or more networks, network usage data associated with one or more users who access the one or more networks, or one or more requests for network services from the one or more users, and/or the like. In some embodiments, the one or more network performance metrics might include, without limitation, at least one of quality of service ("QoS") measurement data, platform resource data and metrics, service usage data, topology and reference data, historical network data, network usage trend data, or data regarding resource costs of network resources, and/or the like. In some cases, the one or more network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might include, without limitation, at least one of service usage data, historical network data, network usage trend data, or network usage data associated with one or more users who access the one or more networks, and/or the like.

Alternatively, or additionally, the computing system (which might include at least one of the computing system 105, the intelligent network automation system 110, or the machine learning system 115, and/or the like) might receive one or more network data associated with one or more networks 150 or 155 (in some cases, via nodes 145 or the like); might analyze, using one or more machine learning techniques (and using at least one of the machine learning system 115 or the QoS test and validate server 165, and/or the like), the received one or more network data to determine how to optimize at least one of the one or more networks or one or more storage services; and might dynamically scale (via intelligent network automation system 110, or the like), in real-time, the at least one of the one or more networks 150 or 155 or one or more storage services, based on the analysis.

According to some embodiments, the one or more network data might include, without limitation, at least one of one or more network performance metrics of one or more networks, network usage data associated with one or more users who access the one or more networks, one or more requests for network services from the one or more users, one or more orders for network services from the one or more users, or one or more business rules associated with the one or more networks, and/or the like. In some instances, the one or more network performance metrics might include, but are not limited to, at least one of QoS measurement data, platform resource data and metrics, service usage data, topology and reference data, historical network data, network usage trend data, or data regarding resource costs of network resources, and/or the like. In some cases, the one or more network performance metrics might include, without limitation, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might include, but are not limited to, at least one of service usage data, historical network data, network usage trend data, or network usage data associated with one or more users who access the one or more networks, and/or the like.

In some embodiments, dynamically scaling the at least one of the one or more networks or the one or more storage services might comprise dynamically scaling, in real-time, the one or more networks to accommodate a combination of current network services provided to the one or more users and future network services as requested or ordered by the one or more users, while maintaining or optimizing the one or more network performance metrics of the one or more networks and while conforming to the one or more business rules. Alternatively, or additionally, dynamically scaling, in real-time, the at least one of the one or more networks or the one or more storage services might comprise at least one of adding, connecting, routing to, or reconfiguring at least one of one or more network nodes, one or more network components, or one or more network resources, dynamically and in real-time, and/or the like. Alternatively, or additionally, dynamically scaling, in real-time, the at least one of the one or more networks or the one or more storage services might comprise at least one of routing around or disconnecting at least one of one or more network nodes, one or more network components, or one or more network resources, dynamically and in real-time. Alternatively, or additionally, dynamically scaling, in real-time, the at least one of the one or more networks or the one or more storage services comprises dynamically scaling the one or more networks to account for changing network usage within predetermined time periods. The predetermined time periods might include, but are not limited to, at least one of one or more predetermined minutes during a work day, one or more predetermined minutes during a weekend day, one or more predetermined hours during a work day, one or more predetermined hours during a weekend day, one or more work days, one or more weekend days, one or more weeks, or one or more months, and/or the like. In some cases, dynamically scaling, with the computing system and in real-time, the at least one of the one or more networks or the one or more storage services might comprise dynamically scaling at least one of one or more network storage devices, one or more content distribution network ("CDN") caches, or one or more data stores, and/or the like.

Alternatively, or additionally, the computing system (which might include at least one of the computing system 105, the intelligent network automation system 110, or the machine learning system 115, and/or the like) might receive at least one of one or more requests for network services from one or more users (via one or more user devices 130a-130n or 135a-135n, or the like) or one or more orders for network services from the one or more users (via one or more user devices 130a-130n or 135a-135n, or the like); might receive at least one of one or more network performance metrics of one or more networks 150 or 155 (in some cases, via nodes 145 or the like) or network usage data associated with the one or more networks 150 or 155 (in some cases, via nodes 145 or the like); might analyze, using one or more machine learning techniques (and using at least one of the machine learning system 115 or the QoS test and validate server 165, and/or the like), at least one of the one or more network performance metrics of one or more networks, the network usage data associated with the one or more networks, the one or more requests for network services from the one or more users, the one or more orders for network services from the one or more users, or one or more business rules associated with the one or more networks; might determine, using the one or more machine learning techniques (and using at least one of the machine learning system 115 or the QoS test and validate server 165, and/or the like), which one or more network resources (e.g., network resources 140, or the like) among at least one of one or more private network resources or one or more public network resources to spin up in order to service the at least one of the one or more requests for network services or the one or more orders for network services, based at least in part on the analysis; and based on such determination, might spin up the determined one or more network resources among the at least one of the one or more private network resources or the one or more public network resources. In some embodiments, the computing system might also determine, using the one or more machine learning techniques (and using at least one of the machine learning system 115 or the QoS test and validate server 165, and/or the like), which one or more second network resources (e.g., network resources 140, or the like) among at least one of the one or more private network resources or the one or more public network resources to spin down in order to release network resources, based at least in part on the analysis; and based on such determination, spin down the determined one or more second network resources (e.g., network resources 140, or the like) among the at least one of the one or more private network resources or the one or more public network resources.

In some instances, the one or more network performance metrics might include, but are not limited to, at least one of QoS measurement data, platform resource data and metrics, service usage data, topology and reference data, historical network data, network usage trend data, or data regarding resource costs of network resources, and/or the like. In some cases, the one or more network performance metrics might include, without limitation, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might include, but are not limited to, at least one of service usage data, historical network data, network usage trend data, or network usage data associated with one or more users who access the one or more networks, and/or the like.

These and other functionalities are described below with respect to FIGS. 2-12C.

Figure 2:
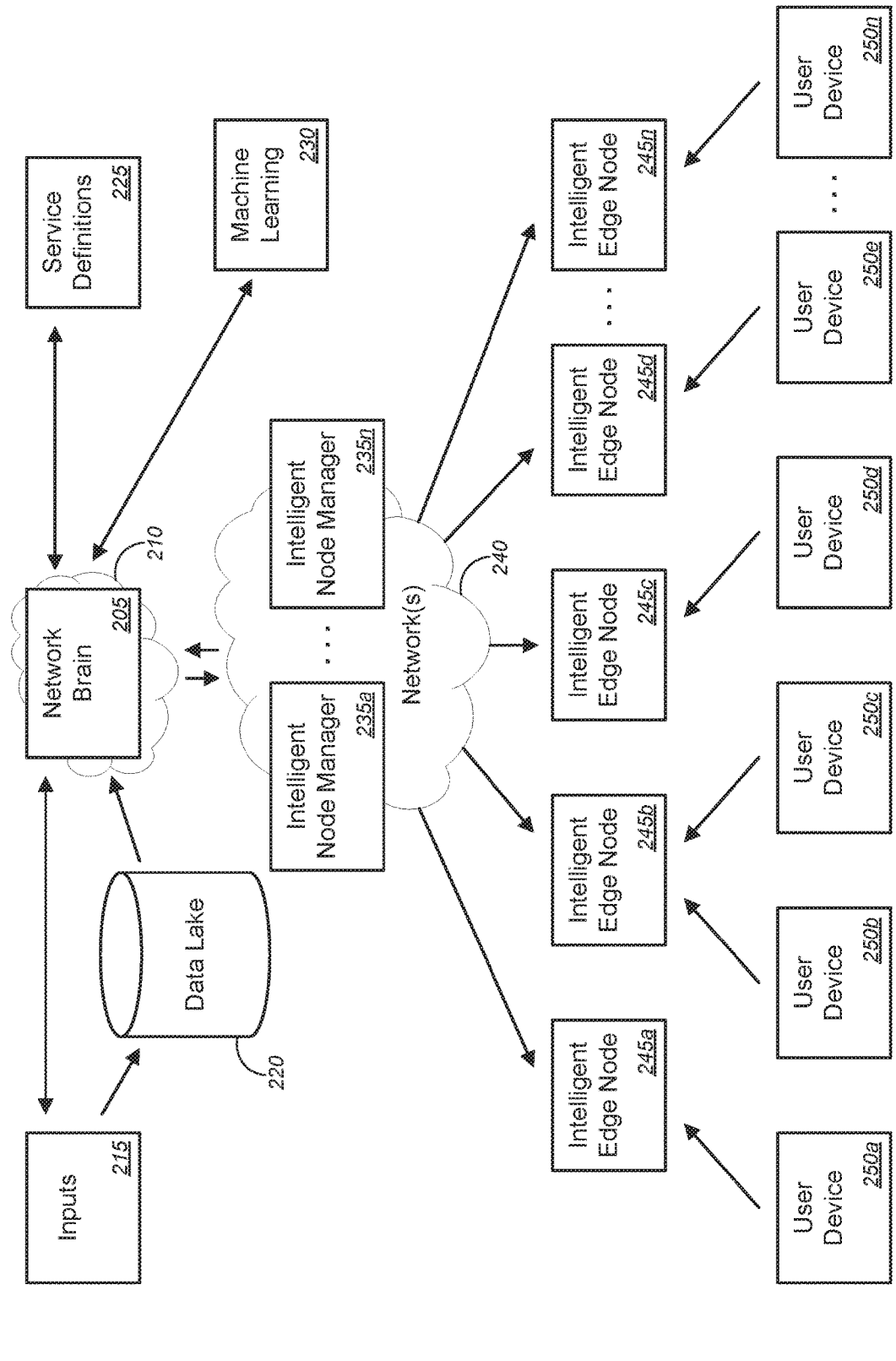
FIG. 2 is a schematic diagram illustrating another system for implementing intelligent network services automation, in accordance with various embodiments.

FIG. 2 is a schematic diagram illustrating another system 200 for implementing intelligent network services automation, in accordance with various embodiments.

In the non-limiting embodiment of FIG. 2, system 200 might comprise a network brain 205 disposed within network(s) 210. System 200 might comprise inputs 215, data lake 220, service definitions 225, and machine learning systems 230. System 200 might further comprise one or more intelligent node managers 235a-235n (collectively, "intelligent node managers 235" or the like) disposed within, or communicatively coupled to, network(s) 240. System 200 might further comprise one or more intelligent edge nodes 245a, 245b, 245c, 245d, through 245n (collectively, "intelligent edge nodes 245" or the like) and one or more user devices 250a, 250b, 250c, 250d, 250e, through 250n (collectively, "user devices 250" or the like).

In operation, the network brain 205, which might be disposed within or communicatively coupled to network(s) 210, might receive inputs 215, including, but not limited to, at least one of one or more business requirements, one or more usage requirements, one or more service definition requirements, one or more contractual requirements, or one or more business rules, and/or the like. The inputs 215 may be stored in data lake 220, from which the network brain 205 might retrieve the stored inputs 215. In some cases, the network brain 205 might receive service definitions 225 including, without limitation, catalog of services, network services, content services, application services, and/or the like. In some instances, the network brain 205 might utilize machine learning 230, including, but not limited to, machine learning algorithms about service definitions, network conditions, failover states, etc.

In various embodiments, the network brain 205 might communicatively couple with intelligent node managers 235a-235n that are disposed in or communicatively coupled to network(s) 240. The intelligent node managers 235 might communicatively couple with the intelligent edge nodes 245. The network brain 205, at least one intelligent node manager 235, and/or at least one intelligent edge node 245 might passively or actively receive at least one of one or more network data, one or more network performance metrics, or network usage data, and/or the like, and, in some cases, might receive one or more requests for network services from the one or more users via the one or more user devices 250. The network brain 205, at least one intelligent node manager 235, and/or at least one intelligent edge node 245 might analyze, using machine learning system 230 or machine learning techniques, the receive at least one of the one or more network data, the one or more network performance metrics, or the network usage data, and/or the like, to determine whether the one or more networks 240 can be improved in terms of network efficiency or network operations. Based at least in part on the analysis, the network brain 205, at least one intelligent node manager 235, and/or at least one intelligent edge node 245 might perform at least one of dynamically reconfiguring at least one of one or more network connections within the one or more networks 240 or one or more network resources within the one or more networks 240, dynamically conditioning the one or more networks 240, dynamically scaling (in real-time) at least one of the one or more networks or one or more storage services, spinning up determined one or more network resources among the at least one of the one or more private network resources or the one or more public network resources, and/or the like.

Figure 3A:
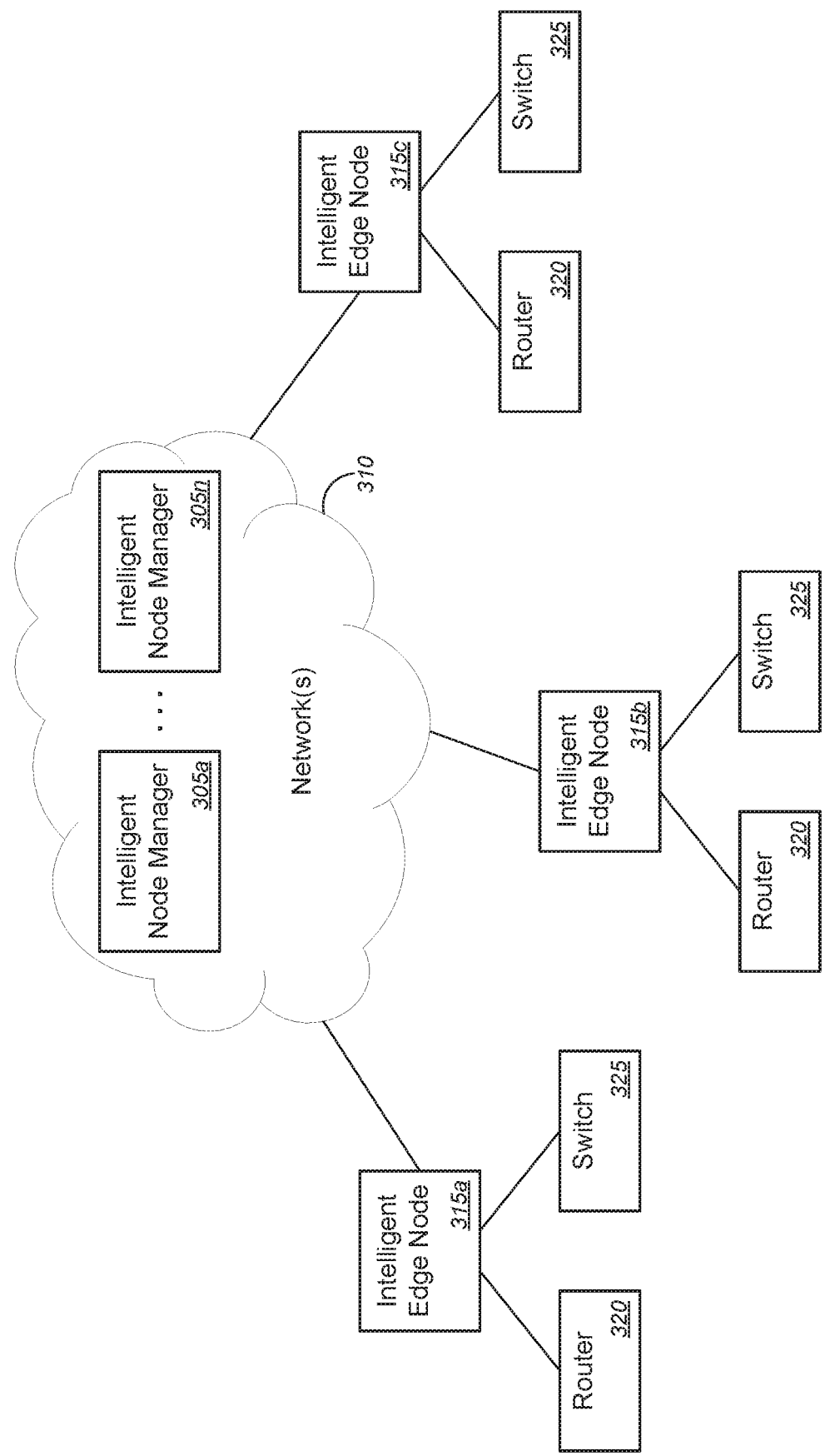
FIGS. 3A and 3B are schematic diagrams illustrating two different configurations of a network that is part of a system for implementing intelligent network services automation, in accordance with various embodiments.
Figure 3B:
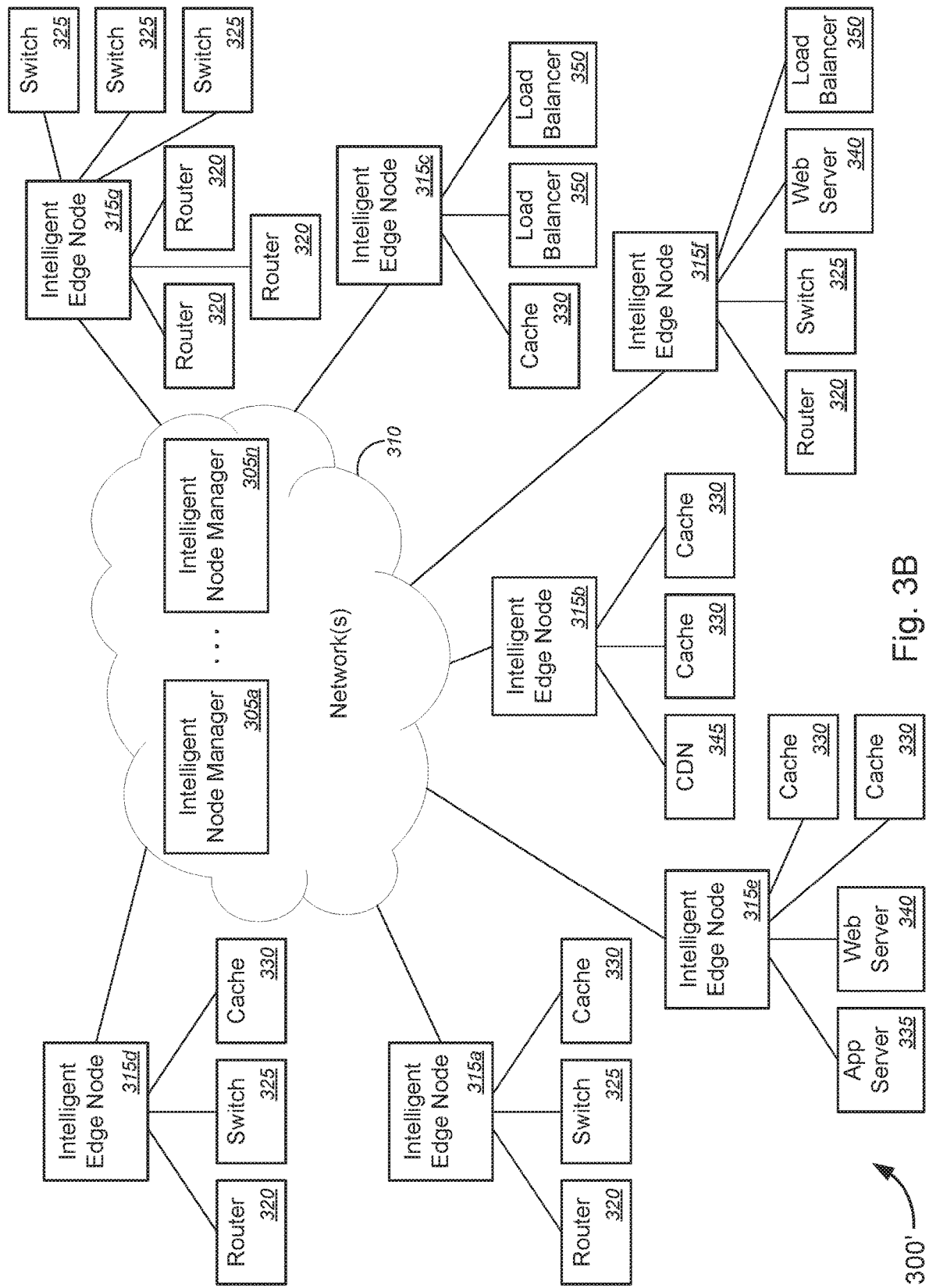

FIGS. 3A and 3B (collectively, "FIG. 3") are schematic diagrams illustrating two different configurations 300 and 300' of a network that is part of a system for implementing intelligent network services automation, in accordance with various embodiments.

In the non-limiting embodiment of FIG. 3A, the system might comprise one or more intelligent node managers 305a-305n (collectively, "intelligent node managers 305" or the like) disposed within, or communicatively coupled to, network(s) 310. In a first configuration 300, the system might comprise a first intelligent edge node 315a, a second intelligent edge node 315b, and a third intelligent edge node 315c (collectively, "intelligent edge nodes 315" or the like), each communicatively coupled to at least one of the one or more intelligent node managers 305 via network(s) 310. Each intelligent edge nodes 315 might communicatively couple to a router 320 and switch 325, or the like.

As shown in FIG. 3B, the system might be reconfigured to include additional intelligent edge nodes, as depicted in a second configuration 300', based on a determination that the one or more network(s) 310 may be improved in terms of network efficiency or network operations—e.g., but not limited to, the analysis as described above with respect to FIGS. 1 and 2, and/or the like. In the second configuration 300', the system might comprise the first intelligent edge node 315a, the second intelligent edge node 315b, the third intelligent edge node 315c, a fourth intelligent edge node 315d, a fifth intelligent edge node 315e, a sixth intelligent edge node 315f, and a seventh intelligent edge node 315g (collectively, "intelligent edge nodes 315" or the like), each communicatively coupled to at least one of the one or more intelligent node managers 305 via network(s) 310. In the second configuration 300', in addition to the router 320 and the switch 325, the first intelligent edge node 315a might further communicatively couple to cache 330, or the like. Further in the second configuration 300', the second intelligent edge node 315b might communicatively decouple from router 320 and switch 325, while communicatively coupling to two different caches 330 and content distribution network ("CDN") 345, or the like. Also in the third configuration 300', the third intelligent edge node 315c might communicatively decouple from router 320 and switch 325, while communicatively coupling to a cache 330 and two separate load balancers 350, or the like. In the second configuration 300', the fourth intelligent edge node 315d might communicatively couple to router 320, switch 325, and cache 330, or the like. Further in the second configuration 300', the fifth intelligent edge node 315e might communicatively couple to two different caches 330, app server 335, and web server 340, or the like. Also in the second configuration 300', the sixth intelligent edge node 315f might communicatively couple to router 320, switch 325, web server 340, and load balancer 350, or the like. In the second configuration 300', the seventh intelligent edge node 315g might communicatively couple to three separate routers 320 and three separate switches 325, or the like.

According to some embodiments, the at least one intelligent node managers 305 might, based on determinations, order new servers or other network components to be shipped to the core network(s) 310 and/or to one or more edge nodes 315, and/or the like. A technician may pick up the ordered (and delivered) new servers or other network components, to install the new servers or other network components at predetermined locations within the network(s). In some cases, zero-touch provisioning may be implemented, in which case virtual network functions ("VNFs") or the like might be sent to hardware within the network(s), thereby remotely configuring or reconfiguring the hardware in a virtual manner to function as at least one of servers, routers, switches, edge nodes, node managers, load balancers, caches, and/or the like, without a technician being required to physically configure or reconfigure any hardware component.

Figure 4:
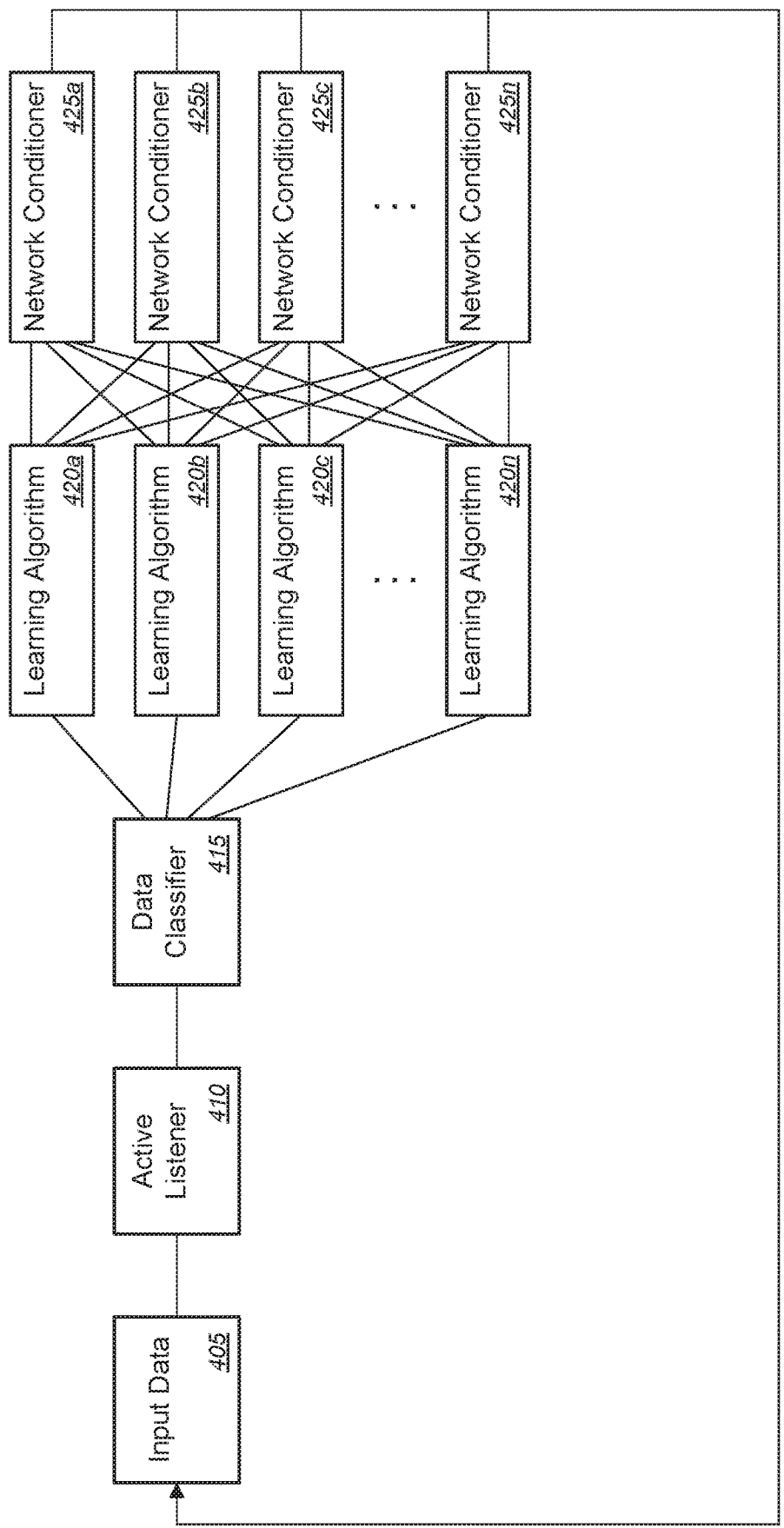
FIG. 4 is a block diagram illustrating a system for implementing intelligent network services automation, in accordance with various embodiments.

FIG. 4 is a block diagram illustrating a system 400 for implementing intelligent network services automation, in accordance with various embodiments.

In the non-limiting embodiment of FIG. 4, system 400 might comprise input data 405, active listener 410, data classifier 415, one or more learning algorithm 420a-420n (collectively, "learning algorithm 420" or the like), and one or more network conditioners 425a-425n (collectively, "network conditioners 425" or the like), or the like.

In operation, structured and/or unstructured input data 405 might be actively retrieved, received, collected, and/or measured from network nodes within one or more networks by active listener 410. The input data 405 might include, without limitation, at least one of one or more network data, one or more network performance metrics, or network usage data, and/or the like.

According to some embodiments, the one or more input data 405 might include at least one of one or more network performance metrics of one or more networks, network usage data associated with one or more users who access the one or more networks, or one or more requests for network services from the one or more users, and/or the like. In some instances, the one or more network performance metrics might include, without limitation, at least one of quality of service ("QoS") measurement data, platform resource data and metrics, service usage data, topology and reference data, historical network data, network usage trend data, or data regarding resource costs of network resources, and/or the like. In some cases, the one or more network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data might include, without limitation, at least one of service usage data, historical network data, network usage trend data, or network usage data associated with one or more users who access the one or more networks, and/or the like.

Data classifier 415 might classify the retrieved one or more input data 405 into at least one of network services, content services, security services, or application services, and/or the like. The network services might include, without limitation, at least one of routing services, firewall services, or switching services, and/or the like, and, in some cases, might be cataloged within a network services pool library, or the like. The content services might include, but are not limited to, at least one of content distribution services, caching services, transcoding services, content packaging services (e.g., HTTP live streaming ("HLS"), dynamic adaptive streaming over HTTP ("DASH"), HTTP smooth streaming ("HSS"), etc.), manifest manipulation, or application acceleration services, and/or the like, and, in some cases, might be cataloged within a content services pool library, or the like. The security services might include, but are not limited to, at least one of web application firewalls, protection against distributed denial of service ("DDOS") attacks, or signature identification for viruses and malware, and/or the like. The application services might include, without limitation, at least one of web server services, payment system services, billing system services, gaming services, streaming services, or e-commerce server services, and/or the like, and, in some cases, might be cataloged within an application services pool library, or the like. In some instances, the data classifier 415 might also access a recipe library, which might include how to configure the services (virtual machines), or the like, to perform data classification. The recipe library might include, without limitation, network services pool router recipe, network services pool switch recipe, and/or the like, content services pool caching node on-demand content, content services pool caching node live streaming, and/or the like.

At least one of the one or more learning algorithms 420a-420n might be used to analyze the classified input data 405, and at least one of the one or more network conditioners 425a-425n might perform at least one of dynamically reconfiguring at least one of one or more network connections within the one or more networks (e.g., networks 150, 155, 240, and/or 310 of FIGS. 1-3, or the like) or one or more network resources within the one or more networks, dynamically conditioning the one or more networks, dynamically scaling (in real-time) at least one of the one or more networks or one or more storage services, spinning up determined one or more network resources among the at least one of the one or more private network resources or the one or more public network resources, and/or the like, based on the analysis. The system 400 might further utilize a feedback loop with input data 405 including, without limitation, at least one of one or more second network performance metrics of one or more networks, second network usage data associated with one or more users who access the one or more networks, or one or more second requests for network services from the one or more users, and/or the like. The at least one of the one or more second network performance metrics of one or more networks, the second network usage data associated with one or more users who access the one or more networks, or the one or more second requests for network services from the one or more users, and/or the like, being retrieved, received, collected, and/or measured from network nodes within the one or more networks after the at least one of the one or more network conditioners 425a-425n performs the at least one of dynamically reconfiguring at least one of one or more network connections within the one or more networks or one or more network resources within the one or more networks, dynamically conditioning the one or more networks, dynamically scaling (in real-time) at least one of the one or more networks or one or more storage services, spinning up determined one or more network resources among the at least one of the one or more private network resources or the one or more public network resources, and/or the like.

Figure 5:
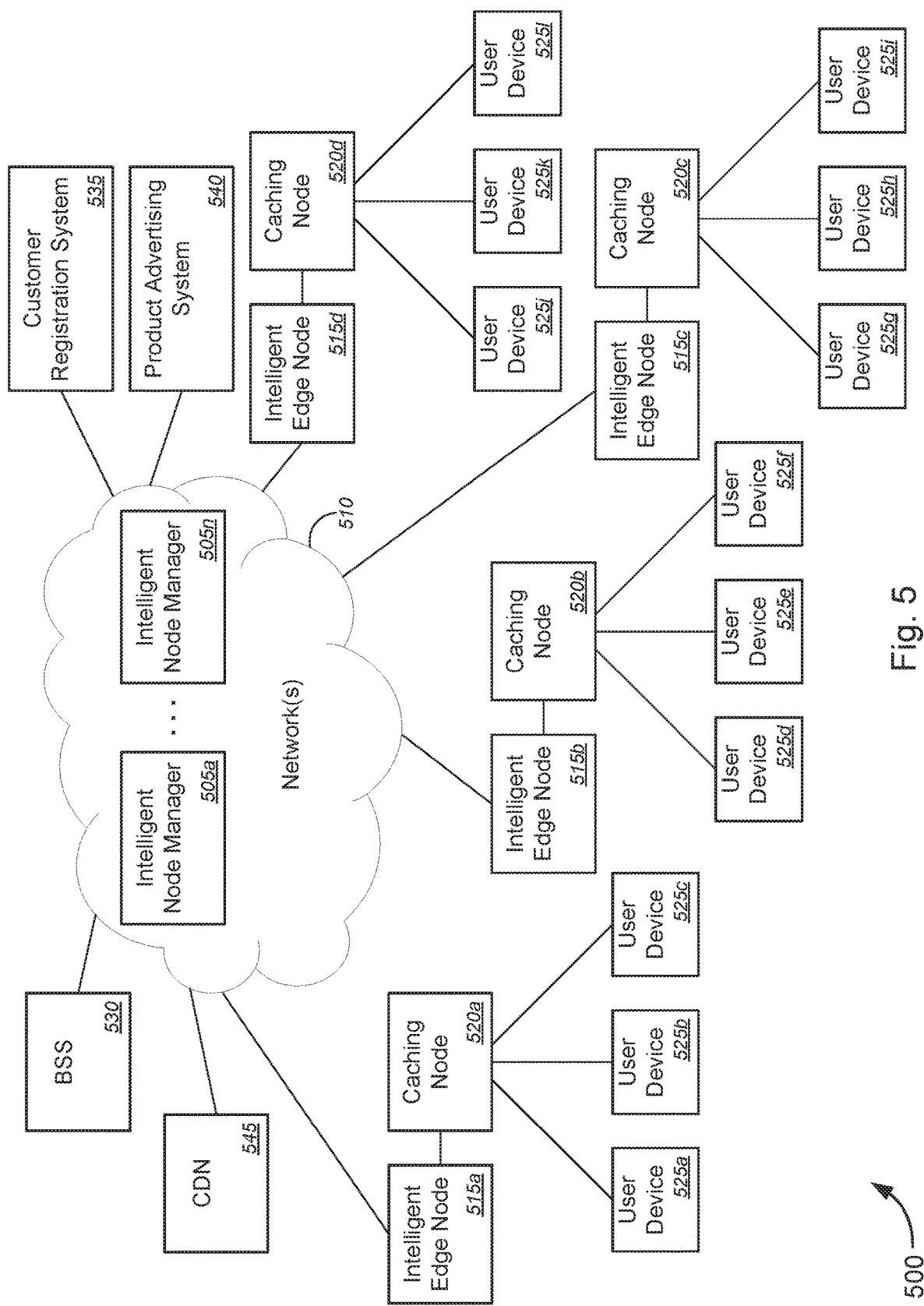
FIG. 5 is a schematic diagram illustrating another system for implementing intelligent network services automation, in accordance with various embodiments.

FIG. 5 is a schematic diagram illustrating another system 500 for implementing intelligent network services automation, in accordance with various embodiments.

In the non-limiting embodiment of FIG. 5, system 500 might comprise one or more intelligent node managers 505a-505n (collectively, "intelligent node managers 505" or the like) disposed within, or communicatively coupled to, network(s) 510. System 500 might further comprise one or more intelligent edge nodes 515a, 515b, 515c, and 515d (collectively, "intelligent edge nodes 515" or the like), each communicatively coupled to at least one of the one or more intelligent node managers 505 via network(s) 510. System 500 might further comprise one or more caching nodes 520a, 520b, 520c, and 520d (collectively, "caching nodes 520" or the like), communicatively coupled to intelligent edge nodes 515a, 515b, 515c, and 515d, respectively. System 500 might further comprise one or more user devices 525a-525c (which might communicatively couple to caching node 520a), one or more user devices 525d-525f (which might communicatively couple to caching node 520b), one or more user devices 525g-525i (which might communicatively couple to caching node 520c), and one or more user devices 525j-525l (which might communicatively couple to caching node 520d), and/or the like. According to some embodiments, system 500 might further comprise business support systems ("BSS") 530, customer registration system 535, and product advertising system 540. System 500 might further comprise CDN 545, or the like.

In operation, at least one intelligent node manager 505 among the one or more intelligent node managers 505a-505n might receive at least one of data associated with customer support, data associated with marketing, or data associated with advertising, and/or the like from the BSS 530. Alternatively, or additionally, the at least one intelligent node manager 505 might receive customer registration information from the customer registration system 535, and might receive product advertising information form the product advertising system 540. The at least one intelligent node manager 505 might receive requests for media content from one or more content consumers via corresponding one or more of the user devices 525a-525l (not expressly shown in FIG. 5). Alternatively, or additionally, based on analysis of at least one of user profiles of the one or more content consumers, viewing history of the one or more content consumers, or information associated with types of media content that the one or more content consumers would most probably enjoy viewing (which may be based on viewing history, profile preferences, listed or analyzed viewing preferences, listed or analyzed genre preferences, etc.), and/or the like, the at least one intelligent node manager 505 might identify one or more media content that the one or more content consumers are determined to likely view. The at least one intelligent node manager 505 might subsequently determine which one or more of the intelligent edge nodes 515a-515d to send the requested and/or identified media content for storing in corresponding one or more caching nodes 520a-520d, to be accessed by the one or more content consumers via the corresponding one or more user devices 525a-525l at the leisure or convenience of the content consumers. Based on such determination, the at least one intelligent node manager 505 might access the requested and/or identified media content from the CDN 545 and might send the accessed media content to the determined one or more of the intelligent edge nodes 515a-515d for storage in the corresponding one or more caching nodes 520a-520d, In this manner, the intelligent node manager can control network usage with respect to content delivery to the content consumers, while avoiding network congestion due to sending requested media content concurrently to many content consumers over the network(s) 510. Advertising and marketing content can likewise be sent and stored in particular caching nodes 520, while avoiding network congestion.

In some aspects, the system might implement content distribution network—machine learning techniques. In some embodiments, an advertising team might run an advertising campaign in one or more markets, e.g., using the product advertising system 540, and the signup results might be stored in the customer registration system 535. In some instances, the system might prepopulate the media content in the one or more markets and users might thus receive the best experience, by the system dynamically turning up or spinning up the CDN caching nodes 520. Alternatively, or additionally, the system might process the sign up data and user preferences from web servers or the like to the at least one intelligent node manager 505, so that the possible usage patterns may be loaded into the machine learning algorithm. Alternatively, or additionally, the system might set-up a new active learner ("AL") in the machine learning system to learn the new network traffic patterns, usage habits, customer characteristics, and/or the like. Alternatively, or additionally, as it learns, the system might automatically turn up or spin up network nodes to dynamically fulfill the content requests. In such a manner, base nodes and/or edge nodes may be turned up or spun up, and then expanded based on historic usage patterns, and/or the like.

Figure 6B:
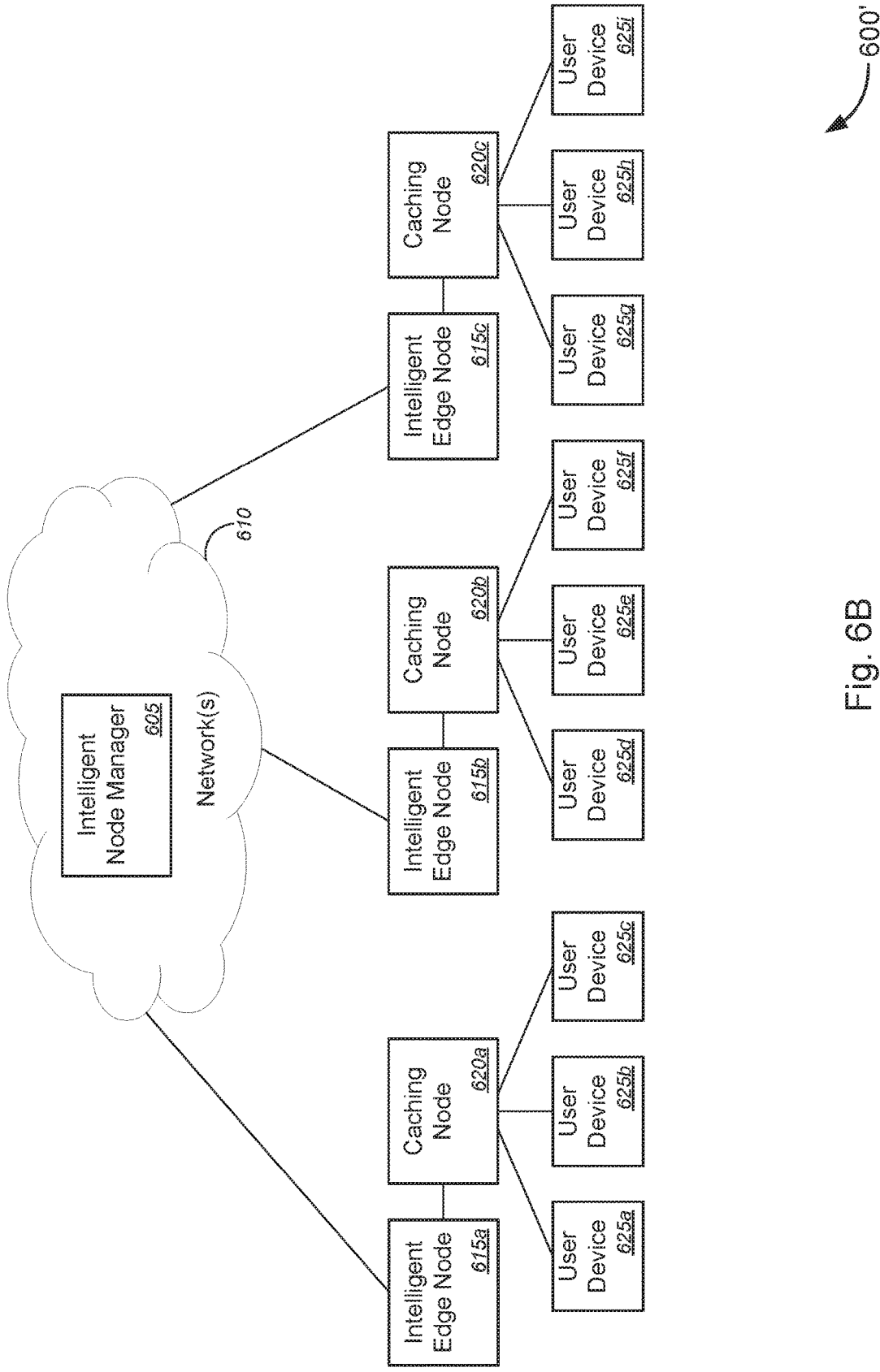
Figure 6C:
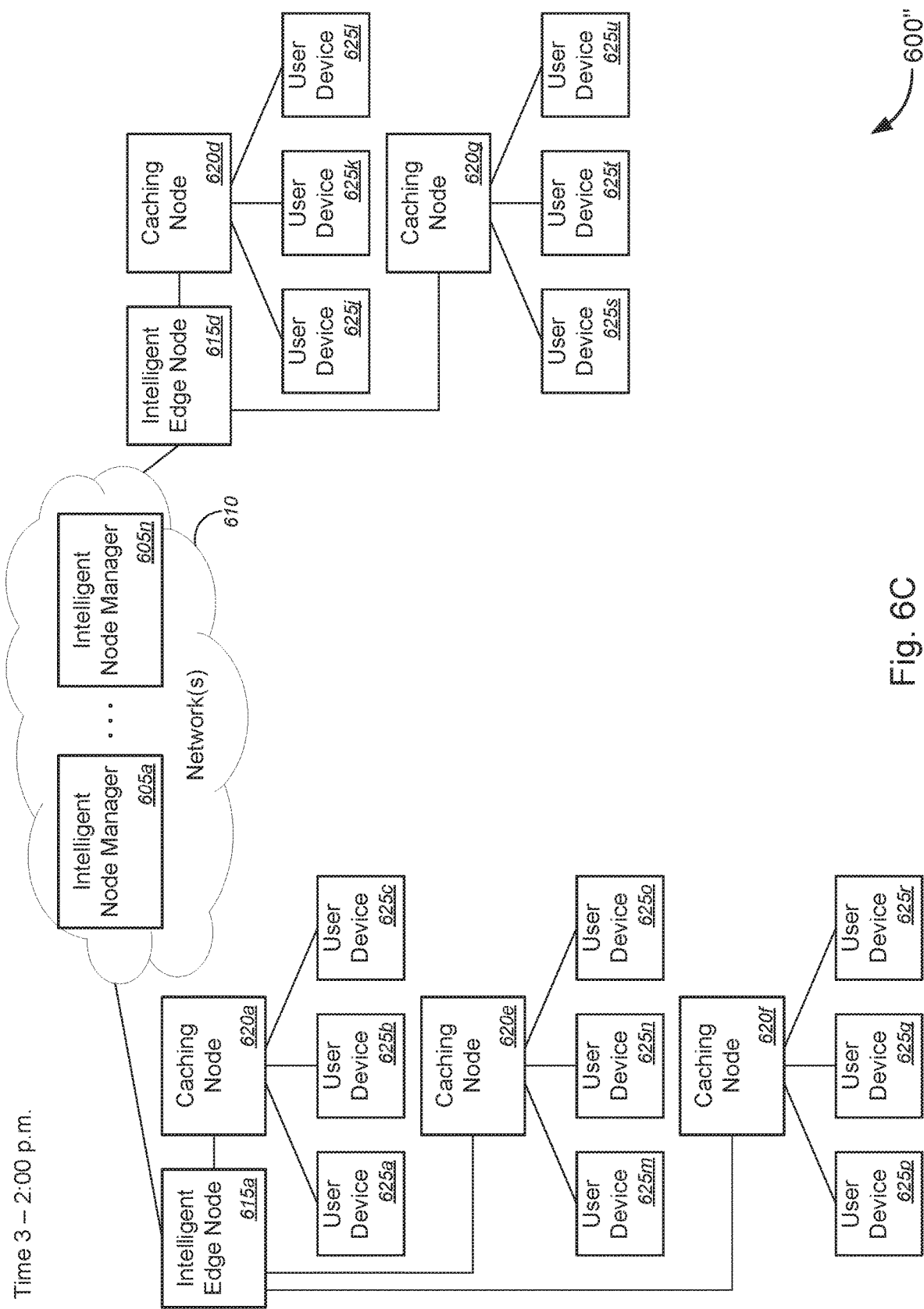

FIGS. 6A-6C (collectively, "FIG. 6") are schematic diagrams illustrating different configurations 600, 600', and 600" of a network that is part of a system for implementing intelligent network services automation during different times of a day, in accordance with various embodiments. Herein, the particular network configurations and times of day are provided merely for purposes of illustration. As such, the various embodiments are not limited to the particular network configurations and times of day, but may be configured or reconfigured in any manner as determined by the intelligent network services automation system as necessary and/or as desired.

In the non-limiting embodiment of FIG. 6A, at time 1 (e.g., at 9:00 a.m.), in a first configuration 600, the system might comprise intelligent node manager 605 disposed within, or communicatively coupled to, network(s) 610. In the first configuration 600, the system might further comprise first intelligent edge node 615a, first caching node 620a, and one or more first user devices 625a-625c (collectively, "first user devices 625" or the like). In the first configuration 600, the first intelligent edge node 615a might communicatively couple to intelligent node manager 605 via network(s) 610 and to first caching node 620a, The one or more first user devices 625 might communicatively couple to the first caching node 620a.

With reference to the non-limiting embodiment of FIG. 6B, at time 2 (e.g., at 11:00 a.m.), in a second configuration 600'—in addition to the intelligent node manager 605, network(s) 610, the first intelligent edge node 615a, the first caching node 620a, and the one or more first user devices 625 in the first configuration 600, as shown in FIG. 6A—, the system might further comprise second intelligent edge node 615b, second caching node 620b, one or more second user devices 625d-625f (collectively, "second user devices 625" or the like), third intelligent edge node 615c, third caching node 620c, one or more third user devices 625g-

625*i* (collectively, "third user devices 625" or the like). In the second configuration 600', the second intelligent edge node 615*b* might communicatively couple to intelligent node manager 605 via network(s) 610 and to second caching node 620*b*, The one or more second user devices 625 might communicatively couple to the second caching node 620*b*, In the second configuration 600', the third intelligent edge node 615*c* might communicatively couple to intelligent node manager 605 via network(s) 610 and to third caching node 620*c*, The one or more third user devices 625 might communicatively couple to the third caching node 620*c*.

Referring to the non-limiting embodiment of FIG. 6C, at time 3 (e.g., at 2:00 p.m.), in a third configuration 600"—in addition to the intelligent node manager 605, network(s) 610, the first intelligent edge node 615*a*, the first caching node 620*a*, and the one or more first user devices 625 in the first configuration 600, as shown in FIG. 6—, the system might further comprise two or more intelligent node managers 605*a*-605*n* (collectively, "intelligent node managers 605" or the like), fourth intelligent edge node 615*d*, fourth caching node 620*d*, one or more fourth user devices 625*j*-625*l* (collectively, "fourth user devices 625" or the like), fifth caching node 620*e*, one or more fifth user devices 625*m*-625*o* (collectively, "fifth user devices 625" or the like), sixth caching node 620*f*, one or more sixth user devices 625*p*-625*r* (collectively, "sixth user devices 625" or the like), and seventh caching node 620*g*, one or more seventh user devices 625*s*-625*u* (collectively, "seventh user devices 625" or the like), or the like. In the third configuration 600", in addition to being communicatively coupled to the first caching node 620*a* (which is communicatively coupled to the first user devices 625), the first intelligent edge node 615*a* might communicatively couple to at least one of the one or more intelligent node managers 605*a*-605*n* via network(s) 610. The fifth caching node 620*e* might communicatively couple to the first intelligent edge node 615*a* and the fifth user devices 625. The sixth caching node 620*f* might communicatively couple to the first intelligent edge node 615*a* and the sixth user devices 625. In the third configuration 600", the fourth intelligent edge node 615*d* might communicatively couple to at least one of the one or more intelligent node managers 605*a*-605*n* via network(s) 610. The fourth caching node 620*d* might communicatively couple to the fourth intelligent edge node 615*d* and the fourth user devices 625. The seventh caching node 620*g* might communicatively couple to the fourth intelligent edge node 615*d* and the seventh user devices 625.

In other words, based on analysis (which may be aided by machine learning systems and/or algorithms as described herein), by the intelligent node manager(s) 605, of at least one of actual network usage, expected network usage, requested services by users, ordered services by users, network performance metrics, status information regarding network components and/or nodes, and/or the like (or other factors), as described herein with respect to FIGS. 1-5 and 7-12, the intelligent node manager(s) 605 might reconfigure the network(s) 610 and the network connections, while spinning up or down network resources and/or network nodes or dynamically scaling (up or down) the network system (and system connections), e.g., as illustrated by the non-limiting configurations 600, 600', and 600" of FIGS. 6A-6C. In some embodiments, the expected network usage might be based at least in part on historical network usage by users, scheduled activities or events (e.g., live sporting events, awards shows, political events, national or international scientific announcements, and/or the like), and/or the like.

Figure 7:
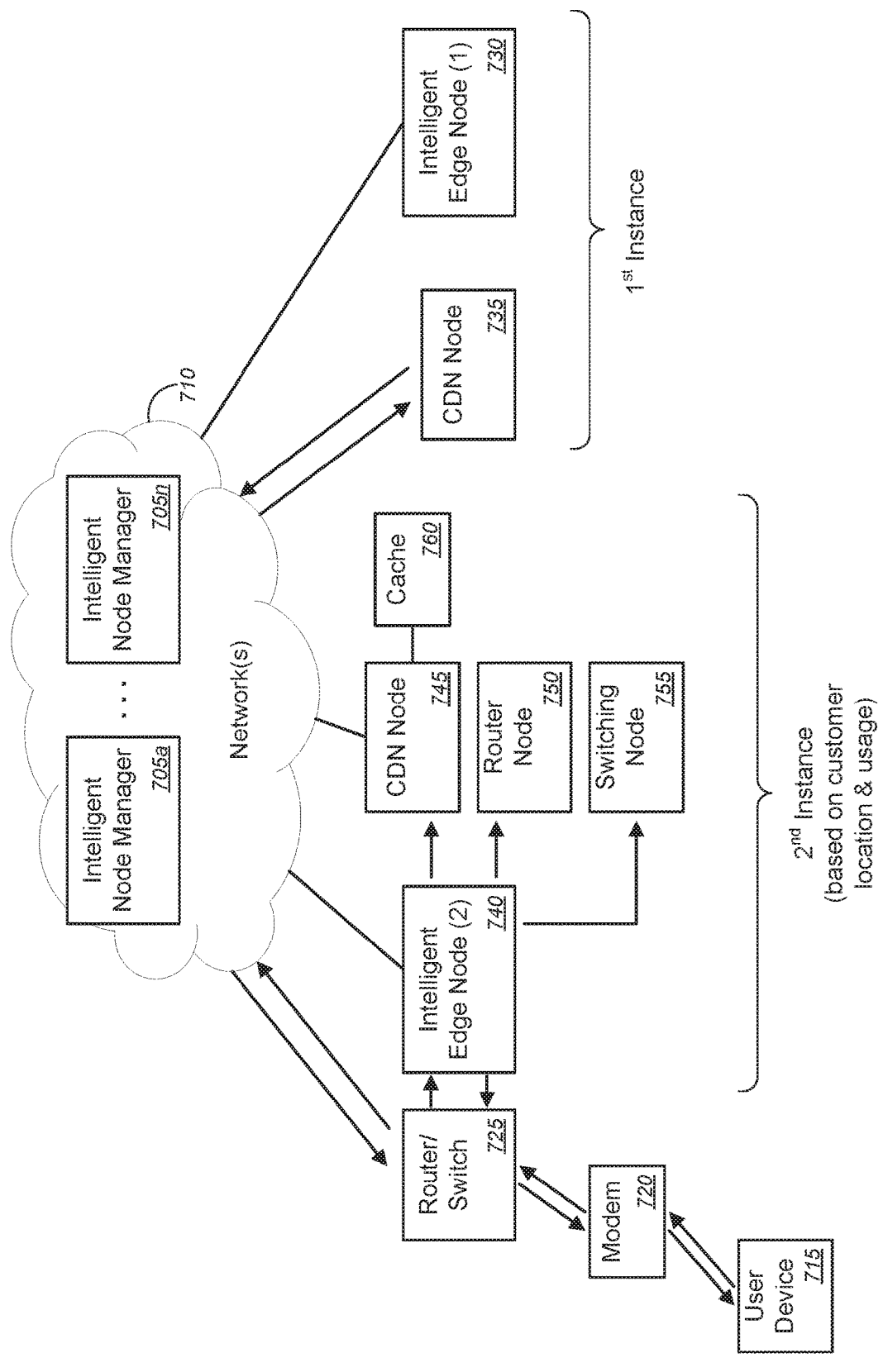
FIG. 7 is a schematic diagram illustrating another system for implementing intelligent network services automation, in accordance with various embodiments.

FIG. 7 is a schematic diagram illustrating another system 700 for implementing intelligent network services automation, in accordance with various embodiments.

In the non-limiting embodiment of FIG. 7, system 700 might comprise one or more intelligent node managers 705*a*-705*n* (collectively, "intelligent node managers 705" or the like) disposed within, or communicatively coupled to, network(s) 710. System 700 might further comprise user device 715, modem 720, router/switch 725, first intelligent edge node 730, CDN node 735, second intelligent edge node 740, CDN node 745, router node 750, switching node 755, and cache 760.

In operation, a user might send a request for media content via user device 715. The user device 715 might relay the request for media content to at least one intelligent node manager 705 of the one or more intelligent node managers 705*a*-705*n* via modem 720 and router-switch 725. In a first instance, the at least one intelligent node manager 705 might communicatively couple to the first intelligent edge node 730, which might access and/or spin up CDN node 735 to retrieve and send the requested media content to the user device 715 via the network(s) 710, the router/switch 725, and the modem 720. Based on customer location and usage, and based on an increase in usage of the network(s) 710 by a plurality of users, in the second instance, the at least one intelligent node manager 705 might access and/or spin up the second intelligent edge node 740, the CDN node 745, the router node 750, the switching node 755, and cache 760; might retrieve the requested media content from cache 760 via CDN node 745 and the second intelligent edge node 740; and might send the requested media content to the user device 715 via the network(s) 710, the router/switch 725, and the modem 720. The at least one intelligent node manager 705 might also access and/or spin up the router node 750 and/or the switching node 755 to route and/or switch, via the second intelligent edge node 740, network traffic to service other users among the plurality of users.

Figure 8:
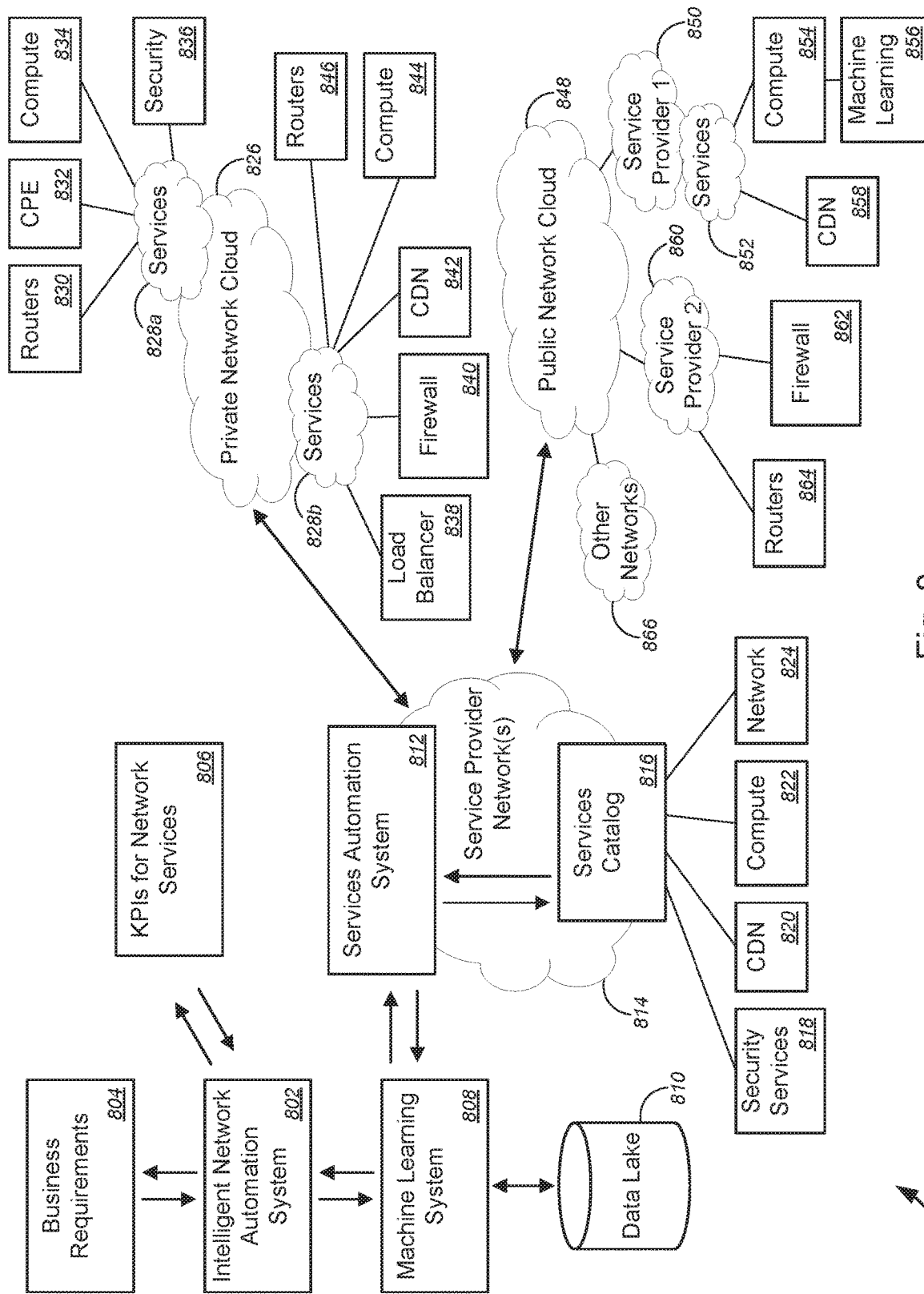
FIG. 8 is a schematic diagram illustrating yet another system for implementing intelligent network services automation, in accordance with various embodiments.

FIG. 8 is a schematic diagram illustrating yet another system 800 for implementing intelligent network services automation, in accordance with various embodiments.

In the non-limiting embodiment of FIG. 8, system 800 might comprise intelligent network automation system 802, business requirements system 804, collector of key performance indicators ("KPIs") for network services 806, machine learning system 808, data lake 810, services automation system 812, service provider network(s) 814, services catalog 816, security services resources 818, CDN 820, compute resources 822, network resources 824, private network cloud 826, services networks 828*a* and 828*b*, routers 830, customer premises equipment ("CPE") 832, compute resources 834, security resources 836, load balancer 838, firewall 840, CDN 842, compute resources 844, routers 846, public network cloud 848, service provider #1 network(s) 850, services networks 852, compute resources 854, machine learning system 856, CDN 858, service provider #2 network(s) 860, firewall 862, routers 864, and other networks 866.

In operation, the intelligent network automation system 802 might receive at least one of one or more business requirements 804 and/or one or more KPIs or performance metrics 806, and might utilize machine learning system 808 to analyze the received at least one of the one or more business requirements 804 and/or the one or more KPIs or performance metrics 806 to determine which one or more network resources among at least one of one or more private network resources or one or more public network resources to spin up in order to service the at least one of the one or more requests for network services or the one or more orders for network services. In some embodiments, the one or more KPIs or performance metrics 806 might include, without limitation, at least one of one or more KPIs or performance metrics of one or more networks; network usage data associated with the one or more networks; quality of service ("QoS") measurement data; platform resource data and metrics; service usage data; topology and reference data; historical network data; network usage trend data; data regarding resource costs of network resources; information regarding at least one of latency, jitter, bandwidth, packet loss, nodal connectivity, compute resources, storage resources, memory capacity, routing, operations support systems ("OSS"), or business support systems ("BSS"), and/or the like; or information regarding at least one of fault, configuration, accounting, performance, or security ("FCAPS"), and/or the like; and/or the like. In some instances, the network usage data associated with the one or more networks might include, but are not limited to, at least one of service usage data, historical network data, network usage trend data, or network usage data associated with one or more users who access the one or more networks, and/or the like. The intelligent network automation system 802 and/or the machine learning system 808 might store the at least one of the one or more business requirements 804 and/or the one or more KPIs or performance metrics 806 in data lake 810.

In some cases, the intelligent network automation system 802 and/or the machine learning system 808 might utilize the services automation system 812 to access the services catalog 816 to provide, among other services, security services resources 818, CDN 820, compute resources 822, and network resources 824, and/or the like. Based on the determination as to which one or more network resources among at least one of one or more private network resources or one or more public network resources to spin up in order to service the at least one of the one or more requests for network services or the one or more orders for network services, the intelligent network automation system 802 and/or the machine learning system 808 might spin up the determined one or more network resources among the at least one of the one or more private network resources or the one or more public network resources, and/or the like. The one or more private network resources might include services 828a—including, without limitation, the routers 830, CPE 832, compute resources 834, security resources 836, and/or the like—and services 828b—including, without limitation, the load balancer 838, the firewall 840, the CDN 842, the compute resources 844, the routers 846, and/or the like—both accessible via private network cloud 826. The one or more public network resources might include services provided by service provider #1 850—including, without limitation, the compute resources 854, machine learning system 856, CDN 858, and/or the like via services 852 —, services provided by service provider #2 860—including, without limitation, the firewall 862, routers 864, and/or the like—, and/or services provided by other networks, all accessible via public network cloud 848.

According to some embodiments, the intelligent network automation system 802 and/or the machine learning system 808 might determine which one or more second network resources among at least one of the one or more private network resources or the one or more public network resources to spin down in order to release network resources. Based on such determination, the intelligent network automation system 802 and/or the machine learning system 808 might spin down the determined one or more second network resources among the at least one of the one or more private network resources or the one or more public network resources, and/or the like.

FIGS. 9A-9D (collectively, "FIG. 9") are flow diagrams illustrating a method 900 for implementing intelligent network services automation, in accordance with various embodiments.

While the techniques and procedures are depicted and/or described in a certain order for purposes of illustration, it should be appreciated that certain procedures may be reordered and/or omitted within the scope of various embodiments. Moreover, while the method 900 illustrated by FIG. 9 can be implemented by or with (and, in some cases, are described below with respect to) the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), such methods may also be implemented using any suitable hardware (or software) implementation. Similarly, while each of the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), can operate according to the method 900 illustrated by FIG. 9 (e.g., by executing instructions embodied on a computer readable medium), the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8 can each also operate according to other modes of operation and/or perform other suitable procedures.

In the non-limiting embodiment of FIG. 9A, method 900 might comprise receiving, with a computing system, one or more network performance metrics of one or more networks (block 905) and receiving, with the computing system, network usage data associated with the one or more networks (block 910). Method 900, at block 915, might comprise analyzing, with the computing system and using one or more machine learning techniques, the received one or more network performance metrics and the received network usage data to determine whether the one or more networks can be improved in terms of network efficiency or network operations. At block 920, method 900 might comprise, based on a determination that the one or more networks can be improved, dynamically reconfiguring, using the computing system, at least one of one or more network connections within the one or more networks or one or more network resources within the one or more networks, and/or the like.

In some embodiments, the one or more network performance metrics might include, without limitation, at least one of quality of service ("QoS") measurement data, platform resource data and metrics, service usage data, topology and reference data, historical network data, network usage trend data, or data regarding resource costs of network resources, and/or the like. Alternatively, the one or more network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. According to some embodiments, the network usage data might include, without limitation, at least one of service usage data, historical network data, network usage trend data, or network usage data associated with one or more users who access the one or more networks, and/or the like.

Turning to FIG. 9B, method 900 might further comprise, at block 925, receiving, with the computing system, one or more inputs. The one or more inputs might include, but are not limited to, at least one of one or more business requirements, one or more usage requirements, one or more service definition requirements, one or more contractual requirements, or one or more business rules, and/or the like. At block 930, method 900 might comprise analyzing, with the computing system and using one or more machine learning techniques, the received one or more network performance metrics, the received network usage data, and the received one or more inputs to determine whether the one or more networks can be improved in terms of network efficiency or network operations. Method 900 might further comprise (and in some cases, dynamically reconfiguring the at least one of the one or more network connections within the one or more networks or the one or more network resources within the one or more networks (at block 920) might comprise) dynamically reconfiguring, using the computing system, at least one of the one or more network connections within the one or more networks or the one or more network resources within the one or more networks, based at least in part on the analysis (block 935).

In some embodiments, dynamically reconfiguring the at least one of the one or more network connections within the one or more networks or the one or more network resources within the one or more networks might be limited by one or more thresholds. In some cases, the one or more thresholds might comprise at least one of one or more customer-defined thresholds, one or more confirmation-seeking thresholds, or one or more system-wide thresholds, and/or the like. Some non-limiting examples of the one or more customer-defined thresholds might include, but are not limited to, allowing from 5 Mbps to 20 Mbps variance in services or provisioning between 2-4 compute nodes, and/or the like. Non-limiting examples of the one or more confirmation-seeking thresholds might include, without limitation, sending a notification at each 5 Mbps increase with a requirement for confirmation or approval before making the change, notifying a user each time a compute node is being added (and requiring confirmation for such addition), or requiring confirmation after 5 nodes are added before any more can be added, and/or the like. Some non-limiting examples of system-wide thresholds might include, but are not limited to, preventing any one user or customer from taking up most or all of the resources in an edge node or the core network, and/or the like.

With reference to FIG. 9C, method 900 might further comprise receiving, with the computing system, one or more second network performance metrics of the one or more networks (block 940) and receiving, with the computing system, second network usage data associated with the one or more networks (block 945), both after reconfiguring the at least one of the one or more network connections within the one or more networks or the one or more network resources within the one or more networks. At block 950, method 900 might comprise analyzing, with the computing system and using one or more machine learning techniques, the received one or more second network performance metrics and the received second network usage data to determine whether the one or more networks can be further improved in terms of network efficiency or network operations. Method 900, at block 955, might comprise, based on a determination that the one or more networks can be further improved, dynamically reconfiguring, using the computing system, at least one of the one or more network connections within the one or more networks or the one or more network resources within the one or more networks.

Referring to FIG. 9D, method 900 might further comprise (and in some cases, determining whether the one or more networks can be improved in terms of network efficiency or network operations (at block 915) might comprise) determining whether the one or more networks can be improved in terms of network efficiency or network operations in anticipation of expected network usage based on the analysis (block 960). At block 965, method 900 might comprise dynamically reconfiguring, using the computing system, the at least one of the one or more network connections within the one or more networks or the one or more network resources within the one or more networks is based at least in part on such determination.

FIGS. 10A-10D (collectively, "FIG. 10") are flow diagrams illustrating another method 1000 for implementing intelligent network services automation, in accordance with various embodiments.

While the techniques and procedures are depicted and/or described in a certain order for purposes of illustration, it should be appreciated that certain procedures may be reordered and/or omitted within the scope of various embodiments. Moreover, while the method 1000 illustrated by FIG. 10 can be implemented by or with (and, in some cases, are described below with respect to) the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), such methods may also be implemented using any suitable hardware (or software) implementation. Similarly, while each of the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), can operate according to the method 1000 illustrated by FIG. 10 (e.g., by executing instructions embodied on a computer readable medium), the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8 can each also operate according to other modes of operation and/or perform other suitable procedures.

Figure 10A:
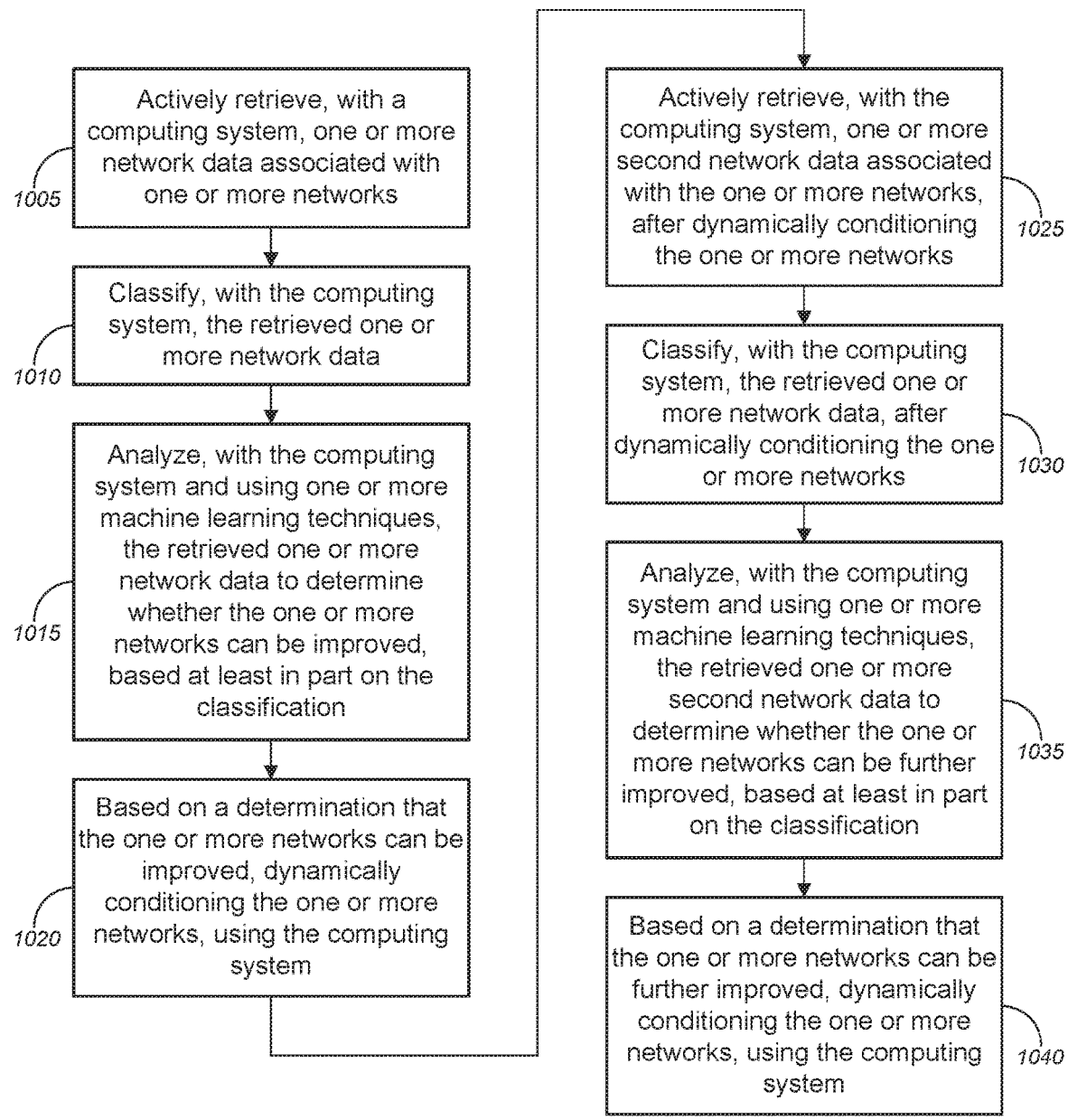

In the non-limiting embodiment of FIG. 10A, method 1000 might comprise actively retrieving, with a computing system, one or more network data associated with one or more networks (block 1005) and classifying, with the computing system, the retrieved one or more network data (block 1010). At block 1015, method 1000 might comprise analyzing, with the computing system and using one or more machine learning techniques, the retrieved one or more network data to determine whether the one or more networks can be improved, based at least in part on the classification. Method 1000 might further comprise, based on a determination that the one or more networks can be improved, dynamically conditioning the one or more networks, using the computing system (block 1020).

In some embodiments, the one or more network data might include, without limitation, at least one of one or more network performance metrics of one or more networks, network usage data associated with one or more users who access the one or more networks, or one or more requests for network services from the one or more users, and/or the like. According to some embodiments, the one or more network performance metrics might include, but are not limited to, at least one of quality of service ("QoS") measurement data, platform resource data and metrics, service usage data, topology and reference data, historical network data, network usage trend data, or data regarding resource costs of network resources, and/or the like. Alternatively, the one or more network performance metrics might include, without limitation, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some cases, the network usage data might include, but is not limited to, at least one of service usage data, historical network data, network usage trend data, or network usage data associated with one or more users who access the one or more networks, and/or the like.

According to some embodiments, method 1000 might comprise actively retrieving, with the computing system, one or more second network data associated with the one or more networks (block 1025) and classifying, with the computing system, the retrieved one or more network data (block 1030), both after dynamically conditioning the one or more networks. At block 1035, method 1000 might comprise analyzing, with the computing system and using one or more machine learning techniques, the retrieved one or more second network data to determine whether the one or more networks can be further improved, based at least in part on the classification. Method 1000, at block 1040, might comprise, based on a determination that the one or more networks can be further improved, dynamically conditioning the one or more networks, using the computing system.

With reference to FIG. 10B, actively retrieving, with the computing system, the one or more network data associated with one or more networks (at block 1005) might comprise one of pulling one or more network data from a data store collecting the one or more network data (block 1045) or subscribing to one or more network data that had been published by one or more network nodes (block 1050), and/or the like.

Referring to FIG. 10C, classifying, with the computing system, the retrieved one or more network data (at block 1010) might comprise classifying the retrieved one or more network data into at least one of network services, content services, security services, or application services, and/or the like (block 1055). In some embodiments, the network services might include, without limitation, at least one of routing services, firewall services, or switching services, and/or the like. In some cases, the content services might include, but are not limited to, at least one of content distribution services, caching services, transcoding services, content packaging services (e.g., HTTP live streaming ("HLS"), dynamic adaptive streaming over HTTP ("DASH"), HTTP smooth streaming ("HSS"), etc.), manifest manipulation, or application acceleration services, and/or the like. According to some embodiments, the security services might include, but are not limited to, at least one of web application firewalls, protection against distributed denial of service ("DDOS") attacks, or signature identification for viruses and malware, and/or the like. In some instances, the application services might include, without limitation, at least one of web server services, payment system services, billing system services, gaming services, streaming services, or e-commerce server services, and/or the like.

Turning to FIG. 10D, dynamically conditioning the one or more networks (at block 1020) might comprise performing at least one of adding, connecting, routing to, routing around, disconnecting, or reconfiguring one or more network nodes or one or more network components, and/or the like (block 1060).

Figure 11A:
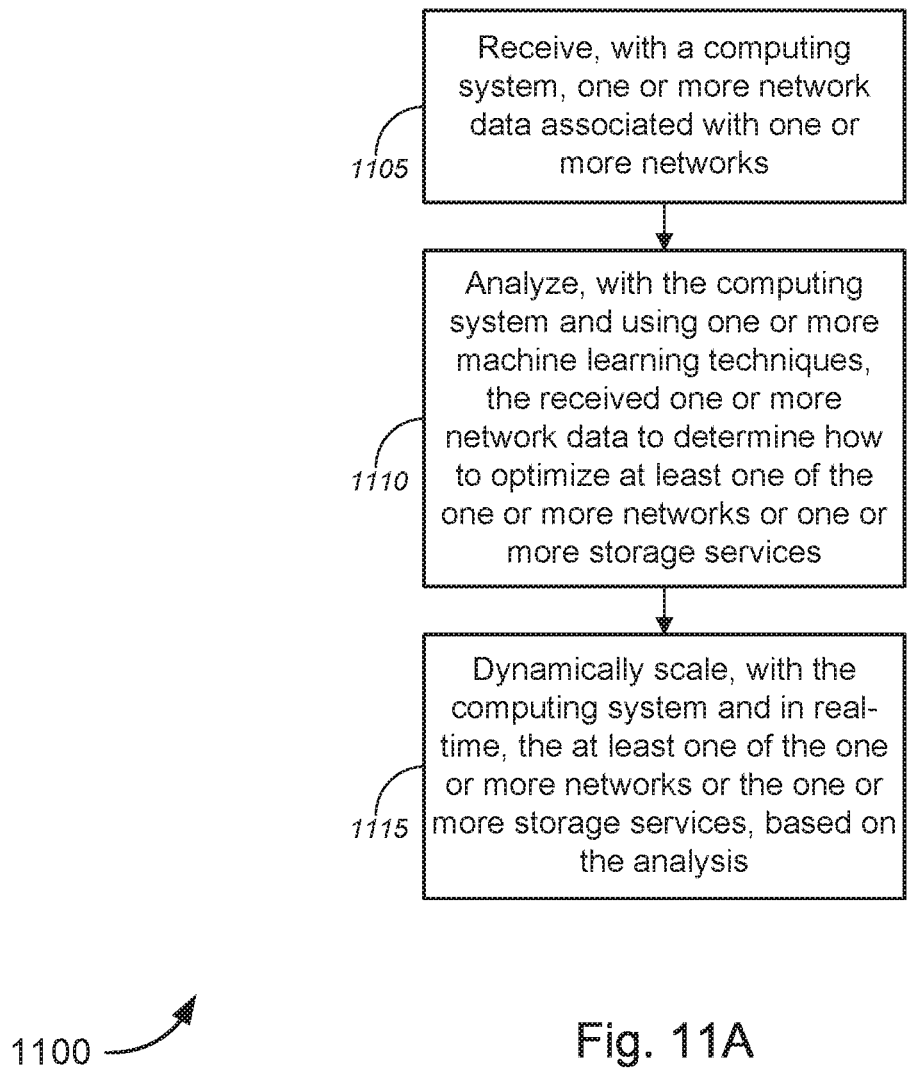
FIGS. 11A and 11B are flow diagrams illustrating yet another method for implementing intelligent network services automation, in accordance with various embodiments.
Figure 11B:
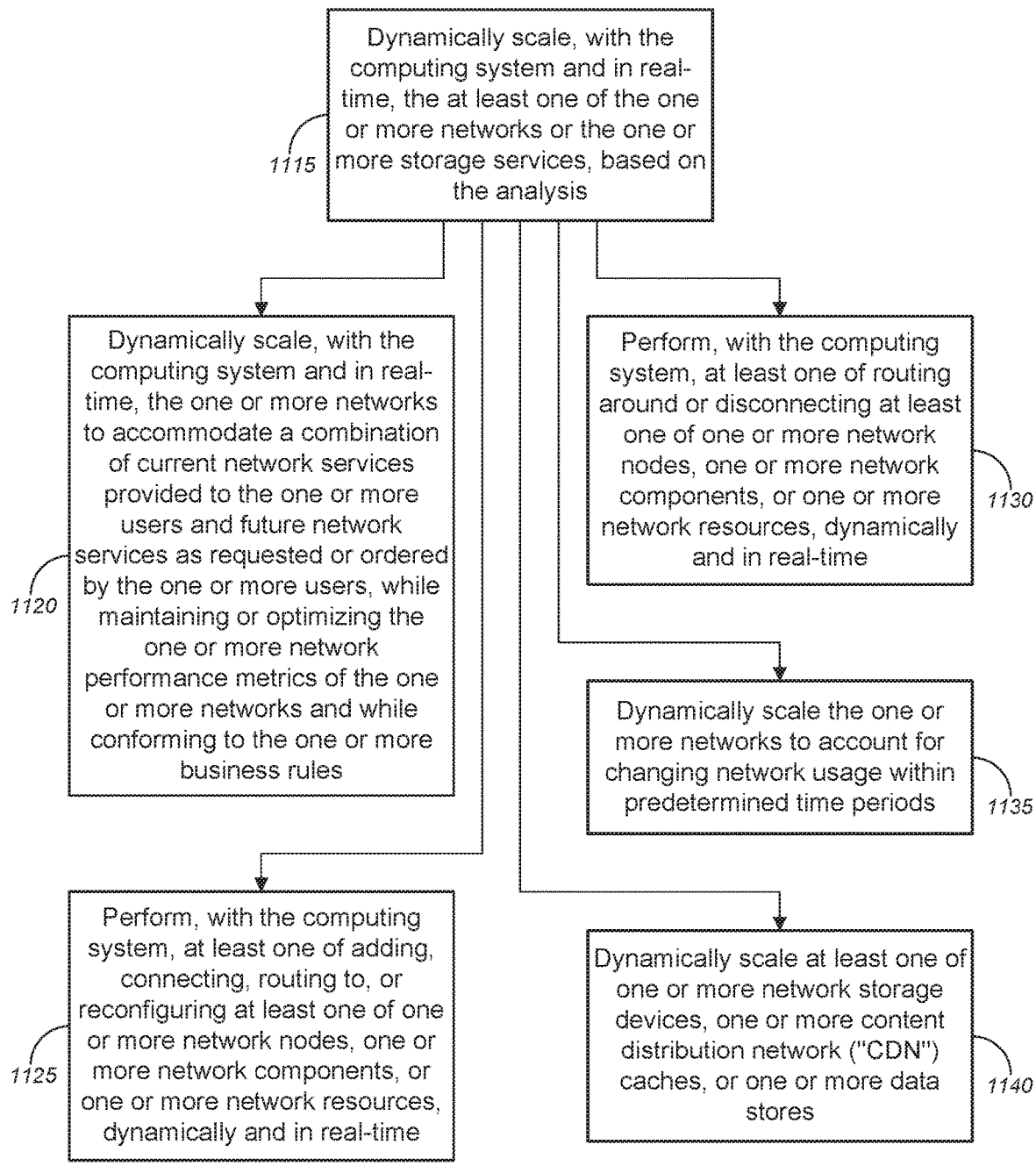

FIGS. 11A and 11B (collectively, "FIG. 11") are flow diagrams illustrating yet another method 1100 for implementing intelligent network services automation, in accordance with various embodiments.

While the techniques and procedures are depicted and/or described in a certain order for purposes of illustration, it should be appreciated that certain procedures may be reordered and/or omitted within the scope of various embodiments. Moreover, while the method 1100 illustrated by FIG. 11 can be implemented by or with (and, in some cases, are described below with respect to) the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), such methods may also be implemented using any suitable hardware (or software) implementation. Similarly, while each of the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), can operate according to the method 1100 illustrated by FIG. 11 (e.g., by executing instructions embodied on a computer readable medium), the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8 can each also operate according to other modes of operation and/or perform other suitable procedures.

In the non-limiting embodiment of FIG. 11A, method 1100 might comprise, at block 1105, receiving, with a computing system, one or more network data associated with one or more networks. Method 1100 might further comprise analyzing, with the computing system and using one or more machine learning techniques, the received one or more network data to determine how to optimize at least one of the one or more networks or one or more storage services (block 1110). At block 1115, method 1100 might comprise dynamically scaling, with the computing system and in real-time, the at least one of the one or more networks or the one or more storage services, based on the analysis.

According to some embodiments, the one or more network data might include, without limitation, at least one of one or more network performance metrics of one or more networks, network usage data associated with one or more users who access the one or more networks, one or more requests for network services from the one or more users, one or more orders for network services from the one or more users, or one or more business rules associated with the one or more networks, and/or the like. In some cases, the one or more network performance metrics might include, but are not limited to, at least one of quality of service ("QoS") measurement data, platform resource data and metrics, service usage data, topology and reference data, historical network data, network usage trend data, or data regarding resource costs of network resources, and/or the like. In some instances, the one or more network performance metrics might include, without limitation, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some embodiments, the network usage data might include, but is not limited to, at least one of service usage data, historical network data, network usage trend data, or network usage data associated with one or more users who access the one or more networks, and/or the like.

With reference to FIG. 11B, dynamically scaling the at least one of the one or more networks or the one or more storage services (at block 1115) might comprise dynamically scaling, with the computing system and in real-time, the one or more networks to accommodate a combination of current network services provided to the one or more users and future network services as requested or ordered by the one or more users, while maintaining or optimizing the one or more network performance metrics of the one or more networks and while conforming to the one or more business rules (block 1120). Alternatively, or additionally, dynamically scaling the at least one of the one or more networks or the one or more storage services (at block 1115) might comprise performing, with the computing system, at least one of adding, connecting, routing to, or reconfiguring at least one of one or more network nodes, one or more network components, or one or more network resources, dynamically and in real-time, and/or the like (block 1125). Alternatively, or additionally, dynamically scaling the at least one of the one or more networks or the one or more storage services (at block 1115) might comprise performing, with the computing system, at least one of routing around or disconnecting at least one of one or more network nodes, one or more network components, or one or more network resources, and/or the like, dynamically and in real-time (block 1130). Alternatively, or additionally, dynamically scaling the at least one of the one or more networks or the one or more storage services (at block 1115) might comprise dynamically scaling the one or more networks to account for changing network usage within predetermined time periods (block 1135). In some embodiments, the predetermined time periods might include, without limitation, at least one of one or more predetermined minutes during a work day, one or more predetermined minutes during a weekend day, one or more predetermined hours during a work day, one or more predetermined hours during a weekend day, one or more work days, one or more weekend days, one or more weeks, or one or more months, and/or the like. In some cases, dynamically scaling, with the computing system and in real-time, the at least one of the one or more networks or the one or more storage services (at block 1115) might comprise dynamically scaling at least one of one or more network storage devices, one or more content distribution network ("CDN") caches, or one or more data stores, and/or the like (block 1140).

Figure 12A:
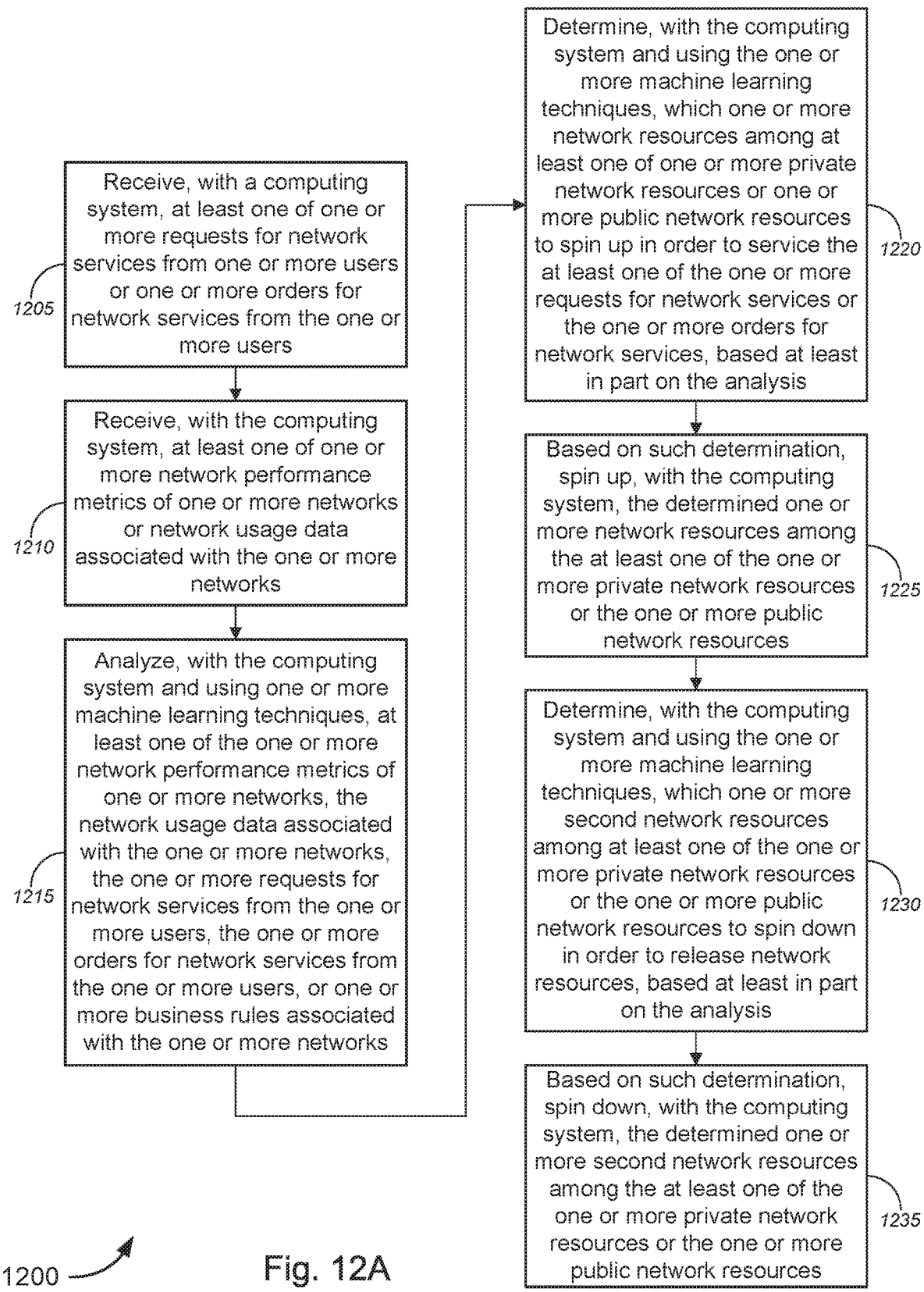

FIGS. 12A-12C (collectively, "FIG. 12") are flow diagrams illustrating still another method 1200 for implementing intelligent network services automation, in accordance with various embodiments.

While the techniques and procedures are depicted and/or described in a certain order for purposes of illustration, it should be appreciated that certain procedures may be reordered and/or omitted within the scope of various embodiments. Moreover, while the method 1200 illustrated by FIG. 12 can be implemented by or with (and, in some cases, are described below with respect to) the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), such methods may also be implemented using any suitable hardware (or software) implementation. Similarly, while each of the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8, respectively (or components thereof), can operate according to the method 1200 illustrated by FIG. 12 (e.g., by executing instructions embodied on a computer readable medium), the systems, configurations, and/or embodiments 100, 200, 300, 300', 400, 500, 600, 600', 600", 700, and 800 of FIGS. 1, 2, 3A, 3B, 4, 5, 6A, 6B, 6C, 7, and 8 can each also operate according to other modes of operation and/or perform other suitable procedures.

In the non-limiting embodiment of FIG. 12A, method 1200 might comprise receiving, with a computing system, at least one of one or more requests for network services from one or more users or one or more orders for network services from the one or more users (block 1205) and receiving, with the computing system, at least one of one or more network performance metrics of one or more networks or network usage data associated with the one or more networks (block 1210). At block 1215, method 1200 might comprise analyzing, with the computing system and using one or more machine learning techniques, at least one of the one or more network performance metrics of one or more networks, the network usage data associated with the one or more networks, the one or more requests for network services from the one or more users, the one or more orders for network services from the one or more users, or one or more business rules associated with the one or more networks, and/or the like. Method 1200 might further comprise determining, with the computing system and using the one or more machine learning techniques, which one or more network resources among at least one of one or more private network resources or one or more public network resources to spin up in order to service the at least one of the one or more requests for network services or the one or more orders for network services, based at least in part on the analysis (block 1220). Method 1200, at block 1225, might comprise, based on such determination, spinning up, with the computing system, the determined one or more network resources among the at least one of the one or more private network resources or the one or more public network resources.

In some embodiments, the one or more network performance metrics might include, without limitation, at least one of quality of service ("QoS") measurement data, platform resource data and metrics, service usage data, topology and reference data, historical network data, network usage trend data, or data regarding resource costs of network resources, and/or the like. In some cases, the one or more network performance metrics might include, but are not limited to, one or more of information regarding at least one of latency, jitter, bandwidth, packet loss, nodal connectivity, compute resources, storage resources, memory capacity, routing, operations support systems ("OSS"), or business support systems ("BSS"), and/or the like, or information regarding at least one of fault, configuration, accounting, performance, or security ("FCAPS"), and/or the like. In some instances, the network usage data associated with the one or more networks might include, but is not limited to, at least one of service usage data, historical network data, network usage trend data, or network usage data associated with one or more users who access the one or more networks, and/or the like.

According to some embodiments, method 1200 might further comprise determining, with the computing system and using the one or more machine learning techniques, which one or more second network resources among at least one of the one or more private network resources or the one or more public network resources to spin down in order to release network resources, based at least in part on the analysis (block 1230). At block 1235, method 1200 might comprise, based on such determination, spinning down, with the computing system, the determined one or more second network resources among the at least one of the one or more private network resources or the one or more public network resources.

With reference to FIG. 12B, spinning up the determined one or more network resources (at block 1225) might comprise performing at least one of adding, connecting, routing to, or reconfiguring at least one of one or more network nodes, one or more network components, or one or more network resources within the one or more networks, and/or the like (block 1240).

Turning to FIG. 12C, spinning down the determined one or more second network resources (at block 1235) might comprise at least one of routing around or disconnecting at least one of one or more network nodes, one or more network components, or one or more network resources within the one or more networks (block 1245).

Exemplary System and Hardware Implementation

Figure 13:
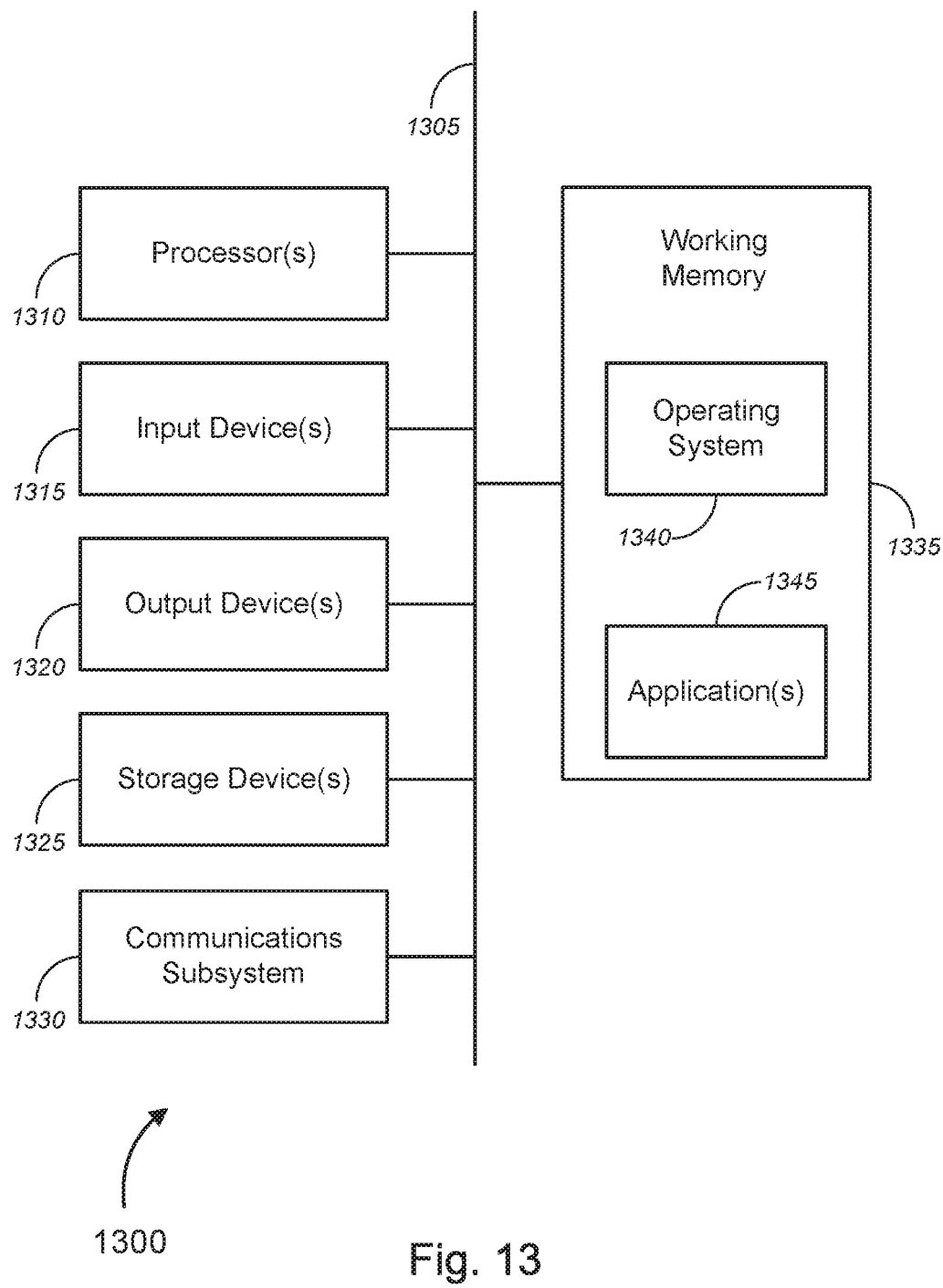
FIG. 13 is a block diagram illustrating an exemplary computer or system hardware architecture, in accordance with various embodiments.

FIG. 13 is a block diagram illustrating an exemplary computer or system hardware architecture, in accordance with various embodiments. FIG. 13 provides a schematic illustration of one embodiment of a computer system 1300 of the service provider system hardware that can perform the methods provided by various other embodiments, as described herein, and/or can perform the functions of computer or hardware system (i.e., computing systems or network brain 105 and 205, intelligent network automation systems 110 and 802, machine learning systems or learning algorithm systems 115, 230, 420a-420n, 808, and 856, user devices 130, 130a-130n, 135, 135a-135n, 250a-250n, 525a-525l, 625a-625u, and 715, network resources 140, nodes 145, quality of service ("QoS") test and validate server 165, intelligent node managers 235a-235n, 305a-305n, 505a-505n, 605, 605a-605n, and 705a-705n, intelligent edge nodes 245a-245n, 315a-315g, 515a-515d, 615a-615d, 730, and 740, routers or router nodes 320, 750, 830, 846, and 864, switches or switching nodes 325 and 755, caches or caching nodes 330, 520a-520d, 620a-620g, and 760, app server 335, web server 340, content distribution network ("CDN") nodes 345, 735, 745, 820, 842, and 858, load balancers 350 and 838, active listener 410, data classifier 415, network conditioners 425a-425n, BSS 530, customer registration system 535, product advertising system 545, modem 720, router/switch 725, services automation system 812, services catalog 816, security services or resources 818 and 836, compute resources 822, 834, 844, and 854, network resource 824, customer premises equipment ("CPE") 832, firewalls 840 and 862, etc.), as described above. It should be noted that FIG. 13 is meant only to provide a generalized illustration of various components, of which one or more (or none) of each may be utilized as appropriate. FIG. 13, therefore, broadly illustrates how individual system elements may be implemented in a relatively separated or relatively more integrated manner.

The computer or hardware system 1300—which might represent an embodiment of the computer or hardware system (i.e., computing systems or network brain 105 and 205, intelligent network automation systems 110 and 802, machine learning systems or learning algorithm systems 115, 230, 420a-420n, 808, and 856, user devices 130, 130a-130n, 135, 135a-135n, 250a-250n, 525a-525l, 625a-625u, and 715, network resources 140, nodes 145, QoS test and validate server 165, intelligent node managers 235a-235n, 305a-305n, 505a-505n, 605, 605a-605n, and 705a-705n, intelligent edge nodes 245a-245n, 315a-315g, 515a-515d, 615a-615d, 730, and 740, routers or router nodes 320, 750, 830, 846, and 864, switches or switching nodes 325 and 755, caches or caching nodes 330, 520a-520d, 620a-620g, and 760, app server 335, web server 340, CDN nodes 345, 735, 745, 820, 842, and 858, load balancers 350 and 838, active listener 410, data classifier 415, network conditioners 425a-425n, BSS 530, customer registration system 535, product advertising system 545, modem 720, router/switch 725, services automation system 812, services catalog 816, security services or resources 818 and 836, compute resources 822, 834, 844, and 854, network resource 824, CPE 832, firewalls 840 and 862, etc.), described above with respect to FIGS. 1-12—is shown comprising hardware elements that can be electrically coupled via a bus 1305 (or may otherwise be in communication, as appropriate). The hardware elements may include one or more processors 1310, including, without limitation, one or more general-purpose processors and/or one or more special-purpose processors (such as microprocessors, digital signal processing chips, graphics acceleration processors, and/or the like); one or more input devices 1315, which can include, without limitation, a mouse, a keyboard, and/or the like; and one or more output devices 1320, which can include, without limitation, a display device, a printer, and/or the like.

The computer or hardware system 1300 may further include (and/or be in communication with) one or more storage devices 1325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 1300 might also include a communications subsystem 1330, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1330 may permit data to be exchanged with a network (such as the network described below, to name one example), with other computer or hardware systems, and/or with any other devices described herein. In many embodiments, the computer or hardware system 1300 will further comprise a working memory 1335, which can include a RAM or ROM device, as described above.

The computer or hardware system 1300 also may comprise software elements, shown as being currently located within the working memory 1335, including an operating system 1340, device drivers, executable libraries, and/or other code, such as one or more application programs 1345, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1325 described above. In some cases, the storage medium might be incorporated within a computer system, such as the system 1300. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 1300 and/or might take the form of source and/or installable code, which, upon compilation and/or installation on the computer or hardware system 1300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1300) to perform methods in accordance with various embodiments of the invention. According to a set of embodiments, some or all of the procedures of such methods are performed by the computer or hardware system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer readable medium, such as one or more of the storage device(s) 1325. Merely by way of example, execution of the sequences of instructions contained in the working memory 1335 might cause the processor(s) 1310 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1300, various computer readable media might be involved in providing instructions/code to processor(s) 1310 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1325. Volatile media includes, without limitation, dynamic memory, such as the working memory 1335. In some alternative embodiments, a computer readable medium may take the form of transmission media, which includes, without limitation, coaxial cables, copper wire, and fiber optics, including the wires that comprise the bus 1305, as well as the various components of the communication subsystem 1330 (and/or the media by which the communications subsystem 1330 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1300. These signals, which might be in the form of electromagnetic signals, acoustic signals, optical signals, and/or the like, are all examples of carrier waves on which instructions can be encoded, in accordance with various embodiments of the invention.

The communications subsystem 1330 (and/or components thereof) generally will receive the signals, and the bus 1305 then might carry the signals (and/or the data, instructions, etc. carried by the signals) to the working memory 1335, from which the processor(s) 1305 retrieves and executes the instructions. The instructions received by the working memory 1335 may optionally be stored on a storage device 1325 either before or after execution by the processor(s) 1310.

Figure 14:
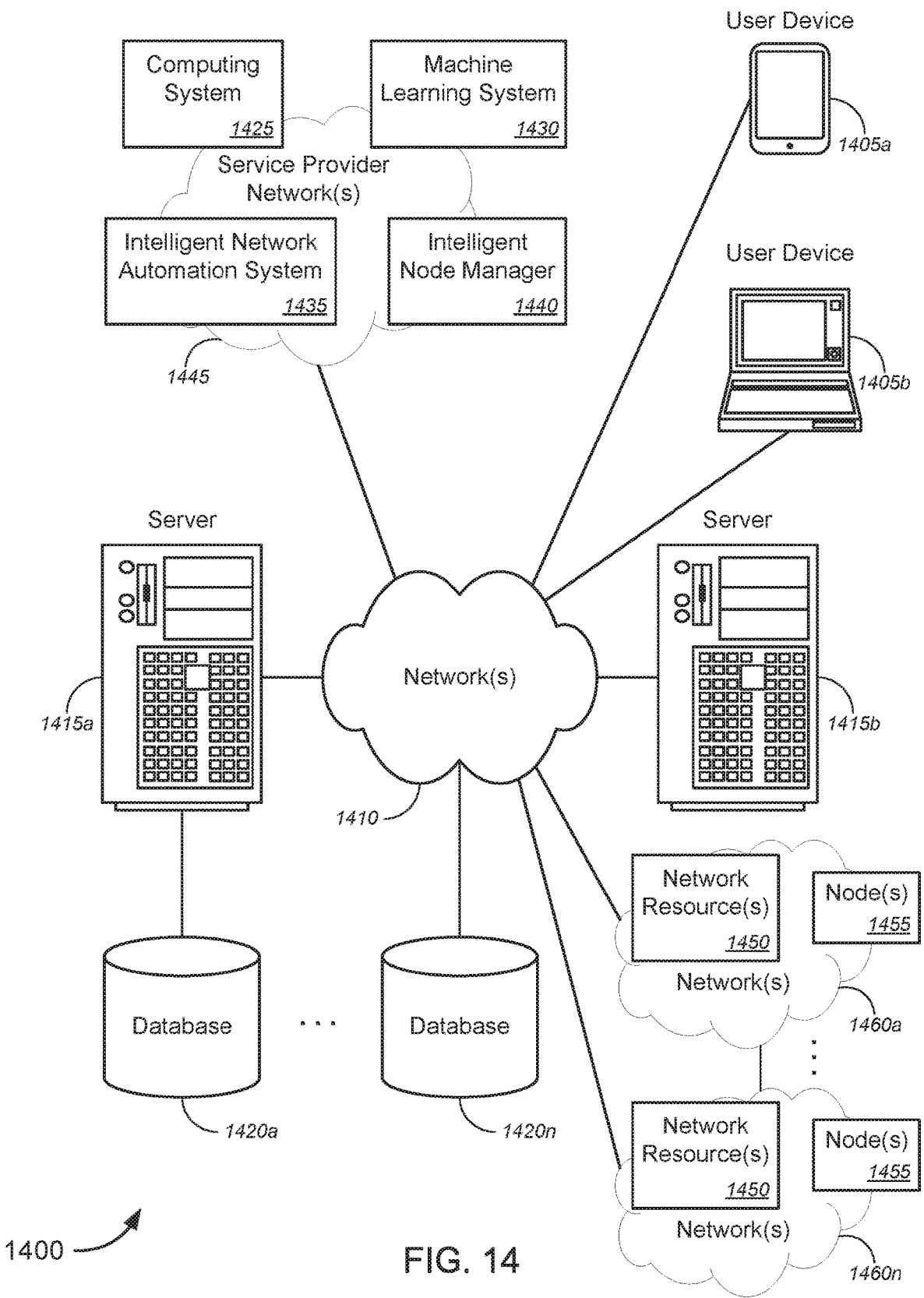
FIG. 14 is a block diagram illustrating a networked system of computers, computing systems, or system hardware architecture, which can be used in accordance with various embodiments.

As noted above, a set of embodiments comprises methods and systems for provisioning network services, and, more particularly, to methods, systems, and apparatuses for implementing intelligent network services automation. FIG. 14 illustrates a schematic diagram of a system 1400 that can be used in accordance with one set of embodiments. The system 1400 can include one or more user computers, user devices, or customer devices 1405. A user computer, user device, or customer device 1405 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1405 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1405 can be any other electronic device, such as a thin-client computer, Internet-enabled mobile telephone, and/or personal digital assistant, capable of communicating via a network (e.g., the network(s) 1410 described below) and/or of displaying and navigating web pages or other types of electronic documents. Although the exemplary system 1400 is shown with two user computers, user devices, or customer devices 1405, any number of user computers, user devices, or customer devices can be supported.

Certain embodiments operate in a networked environment, which can include a network(s) 1410. The network(s) 1410 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1410 (similar to network(s) 120, 125a, 125b, 150a-150n, 155a-155n of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1415. Each of the server computers 1415 may be configured with an operating system, including, without limitation, any of those discussed above, as well as any commercially (or freely) available server operating systems. Each of the servers 1415 may also be running one or more applications, which can be configured to provide services to one or more clients 1405 and/or other servers 1415.

Merely by way of example, one of the servers 1415 might be a data server, a web server, a cloud computing device(s), or the like, as described above. The data server might include (or be in communication with) a web server, which can be used, merely by way of example, to process requests for web pages or other electronic documents from user computers 1405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1405 to perform methods of the invention.

The server computers 1415, in some embodiments, might include one or more application servers, which can be configured with one or more applications accessible by a client running on one or more of the client computers 1405 and/or other servers 1415. Merely by way of example, the server(s) 1415 can be one or more general purpose computers capable of executing programs or scripts in response to the user computers 1405 and/or other servers 1415, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1405 and/or another server 1415. In some embodiments, an application server can perform one or more of the processes for provisioning network services, and, more particularly, to methods, systems, and apparatuses for implementing intelligent network services automation, as described in detail above. Data provided by an application server may be formatted as one or more web pages (comprising HTML, JavaScript, etc., for example) and/or may be forwarded to a user computer 1405 via a web server (as described above, for example). Similarly, a web server might receive web page requests and/or input data from a user computer 1405 and/or forward the web page requests and/or input data to an application server. In some cases, a web server may be integrated with an application server.

In accordance with further embodiments, one or more servers 1415 can function as a file server and/or can include one or more of the files (e.g., application code, data files, etc.) necessary to implement various disclosed methods, incorporated by an application running on a user computer 1405 and/or another server 1415. Alternatively, as those skilled in the art will appreciate, a file server can include all necessary files, allowing such an application to be invoked remotely by a user computer, user device, or customer device 1405 and/or server 1415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1420a-1420n (collectively, "databases 1420"). The location of each of the databases 1420 is discretionary: merely by way of example, a database 1420a might reside on a storage medium local to (and/or resident in) a server 1415a (and/or a user computer, user device, or customer device 1405). Alternatively, a database 1420n can be remote from any or all of the computers 1405, 1415, so long as it can be in communication (e.g., via the network 1410) with one or more of these. In a particular set of embodiments, a database 1420 can reside in a storage-area network ("SAN") familiar to those skilled in the art. (Likewise, any necessary files for performing the functions attributed to the computers 1405, 1415 can be stored locally on the respective computer and/or remotely, as appropriate.) In one set of embodiments, the database 1420 can be a relational database, such as an Oracle database, that is adapted to store, update, and retrieve data in response to SQL-formatted commands. The database might be controlled and/or maintained by a database server, as described above, for example.

According to some embodiments, system 1400 might further comprise a computing system 1425 (similar to computing systems or network brain 105 and 205 of FIGS. 1 and 2, or the like), a machine learning system 1430 (similar to machine learning system or learning algorithm system 115, 230, 420a-420n, 808, and 856 of FIGS. 1, 2, 4, and 8, or the like), an intelligent network automation system 1435 (similar to intelligent network automation systems 110 and 802 of FIGS. 1 and 8, or the like), an intelligent node manager 1440 (similar to intelligent node managers 235a-235n, 305a-305n, 505a-505n, 605, 605a-605n, and 705a-705n of FIGS. 2, 3, and 5-7, or the like), all of which are disposed in or communicatively coupled to service provider networks 1445. System 1400 might further comprise network resources 1450 (similar to network resources 140 of FIG. 1, or the like), nodes 1455 (similar to nodes 145 of FIG. 1, or the like), all of which are disposed in or communicatively coupled to networks 1460a-1460n (collectively, "networks 1460" or the like).

In operation, a computing system (which might include at least one of the computing system 1425, the machine learning system 1430, the intelligent network automation system 1435, or the intelligent node manager 1440, and/or the like) might receive one or more network performance metrics of one or more networks; might receive network usage data associated with the one or more networks; might analyze, using one or more machine learning techniques, the received one or more network performance metrics and the received network usage data to determine whether the one or more networks can be improved in terms of network efficiency or network operations; and based on a determination that the one or more networks can be improved, might dynamically reconfigure at least one of one or more network connections within the one or more networks or one or more network resources within the one or more networks.

Alternatively, or additionally, the computing system (which might include at least one of the computing system 1425, the machine learning system 1430, the intelligent network automation system 1435, or the intelligent node manager 1440, and/or the like) might actively retrieve one or more network data associated with one or more networks; might classify the retrieved one or more network data; might analyze, using one or more machine learning techniques, the retrieved one or more network data to determine whether the one or more networks can be improved, based at least in part on the classification; and based on a determination that the one or more networks can be improved, might dynamically condition the one or more networks.

Alternatively, or additionally, the computing system (which might include at least one of the computing system 1425, the machine learning system 1430, the intelligent network automation system 1435, or the intelligent node manager 1440, and/or the like) might receive one or more network data associated with one or more networks; might analyze, using one or more machine learning techniques, the received one or more network data to determine how to optimize at least one of the one or more networks or one or more storage services; and might dynamically scale, in real-time, the at least one of the one or more networks or the one or more storage services, based on the analysis.

Alternatively, or additionally, the computing system (which might include at least one of the computing system 1425, the machine learning system 1430, the intelligent network automation system 1435, or the intelligent node manager 1440, and/or the like) might receive at least one of one or more requests for network services from one or more users or one or more orders for network services from the one or more users; might receive at least one of one or more network performance metrics of one or more networks or network usage data associated with the one or more networks; might analyze, using one or more machine learning techniques, at least one of the one or more network performance metrics of one or more networks, the network usage data associated with the one or more networks, the one or more requests for network services from the one or more users, the one or more orders for network services from the one or more users, or one or more business rules associated with the one or more networks; might determine, using the one or more machine learning techniques, which one or more network resources among at least one of one or more private network resources or one or more public network resources to spin up in order to service the at least one of the one or more requests for network services or the one or more orders for network services, based at least in part on the analysis; and based on such determination, might spin up the determined one or more network resources among the at least one of the one or more private network resources or the one or more public network resources. In some embodiments, the computing system might also determine, using the one or more machine learning techniques, which one or more second network resources among at least one of the one or more private network resources or the one or more public network resources to spin down in order to release network resources, based at least in part on the analysis; and based on such determination, spin down the determined one or more second network resources among the at least one of the one or more private network resources or the one or more public network resources.

These and other functions of the system 1400 (and its components) are described in greater detail above with respect to FIGS. 1-12.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system, one or more network performance metrics of one or more first networks;
receiving, with the computing system, network usage data associated with the one or more first networks, wherein the network usage data comprises expected network usage associated with one or more scheduled events, the one or more scheduled events comprising at least one of live sporting events, awards shows, political events, or national or international scientific announcements;
receiving, with the computing system, advertising data from a product advertising system, wherein the advertising data comprises one or more marketing locations where one or more marketing campaigns took place;
based on a determination of the one or more marketing locations where the one or more marketing campaigns took place, setting up, in one or more marketing networks where the one or more marketing campaigns took place and with the computing system, an active learner using one or more machine learning techniques to learn one or more new received network performance metrics and one or more new received network usage data caused by the one or more marketing campaigns;
analyzing, with the computing system using the one or more machine learning techniques, the one or more new received network performance metrics caused by the one or more marketing campaigns and the one or more new received network usage data caused by the one or more marketing campaigns to determine whether the one or more marketing networks can be improved in terms of network efficiency or network operations in the one or more marketing locations; and
based on a determination that the one or more marketing networks in the one or more marketing locations can be improved, dynamically reconfiguring, using the computing system, at least one of one or more network connections within the one or more marketing networks in the one or more marketing locations or one or more network resources within the one or more marketing networks in the one or more marketing locations, wherein dynamically reconfiguring at least one of one or more network connections within the one or more marketing networks or one or more network resources within the one or more marketing networks comprises prepopulating media content associated with the one or more marketing campaigns in one or more caching nodes located in the one or more marketing locations.

2. The method of claim 1, wherein the one or more network performance metrics comprise at least one of quality of service ("QoS") measurement data, platform resource data and metrics, service usage data, topology and reference data, historical network data, network usage trend data, or data regarding resource costs of network resources.

3. The method of claim 1, wherein the one or more network performance metrics comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS").

4. The method of claim 1, wherein the network usage data comprises at least one of service usage data, historical network data, network usage trend data, network usage data associated with one or more users who access the one or more marketing networks, or data regarding resource costs of network resources.

5. The method of claim 1, further comprising:
receiving, with the computing system, one or more inputs, the one or more inputs comprising at least one of one or more business requirements, one or more usage requirements, one or more service definition requirements, one or more contractual requirements, or one or more business rules; and
analyzing, with the computing system and using the one or more machine learning techniques, the one or more new received network performance metrics caused by the one or more marketing campaign, the one or more new received network usage data caused by the one or more marketing campaigns, and the received one or more inputs to determine whether the one or more marketing networks can be improved in terms of network efficiency or network operations;
wherein dynamically reconfiguring the at least one of the one or more network connections within the one or more marketing networks or the one or more network resources within the one or more marketing networks comprises dynamically reconfiguring, using the computing system, at least one of the one or more network connections within the one or more marketing networks or the one or more network resources within the one or more marketing networks, based at least in part on the analysis.

6. The method of claim 1, further comprising:
receiving, with the computing system, one or more second network performance metrics of the one or more marketing networks, after reconfiguring the at least one of the one or more network connections within the one or more marketing networks or the one or more network resources within the one or more marketing networks;
receiving, with the computing system, second network usage data associated with the one or more marketing networks, after reconfiguring the at least one of the one or more network connections within the one or more marketing networks or the one or more network resources within the one or more marketing networks;
analyzing, with the computing system and using the one or more machine learning techniques, the received one or more second network performance metrics and the received second network usage data to determine whether the one or more marketing networks can be further improved in terms of network efficiency or network operations; and
based on a determination that the one or more marketing networks can be further improved, dynamically reconfiguring, using the computing system, at least one of the one or more network connections within the one or more marketing networks or the one or more network resources within the one or more marketing networks.

7. The method of claim 1, wherein determining whether the one or more marketing networks can be improved in terms of network efficiency or network operations comprises determining whether the one or more marketing networks can be improved in terms of network efficiency or network operations in anticipation of expected network usage based on the analysis, wherein dynamically reconfiguring the at least one of the one or more network connections within the one or more marketing networks or the one or more network resources within the one or more marketing networks is based at least in part on such determination.

8. The method of claim 1, wherein dynamically reconfiguring the at least one of the one or more network connections within the one or more marketing networks or the one or more network resources within the one or more marketing networks is limited by one or more thresholds, the one or more thresholds comprising at least one of one or more customer-defined thresholds, one or more confirmation-seeking thresholds, or one or more system-wide thresholds.

9. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive one or more network performance metrics of one or more first networks;
receive network usage data associated with the one or more first networks, wherein the network usage data comprises expected network usage associated with one or more scheduled events, the one or more scheduled events comprising at least one of live sporting events, awards shows, political events, or national or international scientific announcements;
receive advertising data from a product advertising system, wherein the advertising data comprises one or more marketing locations where one or more marketing campaigns took place;
based on a determination of the one or more marketing locations where the one or more marketing campaigns took place, set up, in one or more marketing networks where the one or more marketing campaigns took place and with the computing system, an active learner using one or more machine learning techniques to learn one or more new received network performance metrics and one or more new received network usage data caused by the one or more marketing campaigns;
analyze, using the one or more machine learning techniques, the one or more machine learning techniques, the one or more new received network performance metrics caused by the one or more marketing campaigns and the one or more new received network usage data caused by the one or more marketing campaigns to determine whether the one or more marketing networks can be improved in terms of network efficiency or network operations in the one or more marketing locations; and
based on a determination that the one or more networks in the one or more marketing locations can be improved, dynamically reconfigure at least one of one or more network connections within the one or more marketing networks in the one or more marketing locations or one or more network resources within the one or more marketing networks in the one or more marketing locations, wherein dynamically reconfiguring at least one of one or more network connections within the one or more marketing networks or one or more network resources within the one or more marketing networks comprises prepopulating media content associated with the one or more marketing campaigns in one or more caching nodes located in the one or more marketing locations.

10. The apparatus of claim 9, wherein the one or more network performance metrics comprise at least one of quality of service ("QoS") measurement data, platform resource data and metrics, service usage data, topology and reference data, historical network data, network usage trend data, or data regarding resource costs of network resources.

11. The apparatus of claim 9, wherein the one or more network performance metrics comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS").

12. The apparatus of claim 9, wherein the network usage data comprises at least one of service usage data, historical network data, network usage trend data, or network usage data associated with one or more users who access the one or more marketing networks.

13. The apparatus of claim 9, wherein the set of instructions, when executed by the at least one processor, further causes the apparatus to:
receive one or more inputs, the one or more inputs comprising at least one of one or more business requirements, one or more usage requirements, one or more service definition requirements, one or more contractual requirements, or one or more business rules; and
analyze, using the one or more machine learning techniques, the one or more new received network performance metrics caused by the one or more marketing campaigns, the one or more new received network usage data caused by the one or more marketing campaigns, and the received one or more inputs to determine whether the one or more marketing networks can be improved in terms of network efficiency or network operations;
wherein dynamically reconfiguring the at least one of the one or more network connections within the one or more marketing networks or the one or more network resources within the one or more marketing networks comprises dynamically reconfiguring at least one of the one or more network connections within the one or more marketing networks or the one or more network resources within the one or more marketing networks, based at least in part on the analysis.

14. The apparatus of claim 9, wherein the set of instructions, when executed by the at least one processor, further causes the apparatus to:
receive one or more second network performance metrics of the one or more marketing networks, after reconfiguring the at least one of the one or more network connections within the one or more marketing networks or the one or more network resources within the one or more marketing networks;
receive second network usage data associated with the one or more marketing networks, after reconfiguring the at least one of the one or more marketing network connections within the one or more marketing networks or the one or more network resources within the one or more marketing networks;
analyze, using the one or more machine learning techniques, the one or more new received network performance metrics caused by the one or more marketing campaigns and the one or more new received network usage data caused by the one or more marketing campaigns to determine whether the one or more marketing networks can be further improved in terms of network efficiency or network operations; and based on a determination that the one or more marketing networks can be further improved, dynamically reconfigure at least one of the one or more network connections within the one or more marketing networks or the one or more network resources within the one or more marketing networks.

15. The apparatus of claim 9, wherein determining whether the one or more marketing networks can be improved in terms of network efficiency or network operations comprises determining whether the one or more marketing networks can be improved in terms of network efficiency or network operations in anticipation of expected network usage based on the analysis, wherein dynamically reconfiguring the at least one of the one or more network connections within the one or more marketing networks or the one or more network resources within the one or more marketing networks is based at least in part on such determination.

16. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive one or more network performance metrics of one or more first networks, wherein the network usage data comprises expected network usage associated with one or more scheduled events, the one or more scheduled events comprising at least one of live sporting events, awards shows, political events, or national or international scientific announcements;
receive network usage data associated with the one or more first networks;
receive advertising data from a product advertising system, wherein the advertising data comprises one or more marketing locations where one or more marketing campaigns took place;
based on a determination of the one or more marketing locations where the one or more marketing campaigns took place, set up, in one or more marketing networks where the one or more marketing campaigns took place and with the computing system, an active learner using one or more machine learning techniques to learn one or more new received network performance metrics and one or more new received network usage data caused by the one or more marketing campaigns;
analyze, using the one or more machine learning techniques, the one or more machine learning techniques, the one or more new received network performance metrics caused by the one or more marketing campaigns and the one or more new received network usage data caused by the one or more marketing campaigns to determine whether the one or more marketing networks can be improved in terms of network efficiency or network operations in the one or more marketing locations; and based on a determination that the one or more marketing networks in the one or more marketing locations can be improved, dynamically reconfigure at least one of one or more network connections within the one or more marketing networks in the one or more marketing locations or one or more network resources within the one or more marketing networks in the one or more marketing locations, wherein dynamically reconfiguring at least one of one or more network connections within the one or more marketing networks or one or more network resources within the one or more marketing networks comprises prepopulating media content associated with the one or more marketing campaigns in one or more caching nodes located in the one or more marketing locations.

17. The system of claim 16, wherein the one or more network performance metrics comprise at least one of quality of service ("QoS") measurement data, platform resource data and metrics, service usage data, topology and reference data, historical network data, network usage trend data, or data regarding resource costs of network resources.

18. The system of claim 16, wherein the one or more network performance metrics comprise one or more of information regarding at least one of latency, jitter, bandwidth, packet loss, nodal connectivity, compute resources, storage resources, memory capacity, routing, operations support systems ("OSS"), or business support systems ("BSS") or information regarding at least one of fault, configuration, accounting, performance, or security ("FCAPS").

19. The system of claim 16, wherein the network usage data comprises at least one of service usage data, historical network data, network usage trend data, network usage data associated with one or more users who access the one or more marketing networks, or data regarding resource costs of network resources.

20. The system of claim 16, wherein the first set of instructions, when executed by the at least one first processor, further causes the computing system to:
receive one or more inputs, the one or more inputs comprising at least one of one or more business requirements, one or more usage requirements, one or more service definition requirements, one or more contractual requirements, or one or more business rules; and
analyze, using the one or more machine learning techniques, the one or more new received network performance metrics caused by the one or more marketing campaigns, the one or more new received network usage data caused by the one or more marketing campaigns, and the received one or more inputs to determine whether the one or more marketing networks can be improved in terms of network efficiency or network operations;
wherein dynamically reconfiguring the at least one of the one or more network connections within the one or more marketing networks or the one or more network resources within the one or more marketing networks comprises dynamically reconfiguring at least one of the one or more network connections within the one or more marketing networks or the one or more network resources within the marketing one or more networks, based at least in part on the analysis.

21. The system of claim 16, wherein the first set of instructions, when executed by the at least one first processor, further causes the computing system to:
- receive one or more second network performance metrics of the one or more marketing networks, after reconfiguring the at least one of the one or more network connections within the one or more marketing networks or the one or more network resources within the one or more marketing networks;
- receive second network usage data associated with the one or more networks, after reconfiguring the at least one of the one or more network connections within the one or more networks or the one or more network resources within the one or more marketing networks;
- analyze, using the one or more machine learning techniques, the received one or more second network performance metrics and the received second network usage data to determine whether the one or more marketing networks can be further improved in terms of network efficiency or network operations; and
- based on a determination that the one or more marketing networks can be further improved, dynamically reconfigure at least one of the one or more network connections within the one or more marketing networks or the one or more network resources within the one or more marketing networks.

* * * * *